United States Patent

Hittner et al.

[11] Patent Number: 5,711,018
[45] Date of Patent: *Jan. 20, 1998

[54] ROTARY KILN TREATMENT OF POTLINER

[75] Inventors: Herman J. Hittner, Lower Burrell; R. Lee Byers, Upper St. Clair, both of Pa.; John N. Lees, Jr., Brookfield, Wis.; David W. Rierson, Elm Grove, Wis.; Ludmila Dinter-Brown, South Milwaukee, Wis.

[73] Assignee: Aluminum Company of America, Pittsburgh, Pa.

[*] Notice: The term of this patent shall not extend beyond the expiration date of Pat. No. 5,476,990.

[21] Appl. No.: 392,002

[22] Filed: Feb. 21, 1995

Related U.S. Application Data

[62] Division of Ser. No. 084,896, Jun. 29, 1993.

[51] Int. Cl.$^6$ .............. A62D 3/00; C01F 7/02; B09D 3/00
[52] U.S. Cl. .............. 588/201; 423/111; 423/119; 423/120; 423/659; 588/248; 588/252
[58] Field of Search .............. 423/111, 119, 423/120, 659; 588/248, 252, 260, 201

[56] References Cited

U.S. PATENT DOCUMENTS

| | | | |
|---|---|---|---|
| 69,318 | 10/1867 | Cheyney et al. | |
| 2,732,283 | 1/1956 | Clukey | 23/88 |
| 2,776,900 | 1/1957 | Duncan et al. | 106/52 |
| 2,878,004 | 3/1959 | Saeman | 263/32 |
| 3,182,980 | 5/1965 | Helfrich | 263/33 |
| 3,386,394 | 6/1968 | Heise | 110/14 |
| 3,508,742 | 4/1970 | Minegishi | 263/32 |
| 3,556,024 | 1/1971 | Fuller et al. | 110/1 |
| 3,878,287 | 4/1975 | Muller et al. | 423/153 |
| 3,964,916 | 6/1976 | Armistead et al. | 106/38.27 |
| 4,046,086 | 9/1977 | von Dreusche, Jr. | 110/12 |
| 4,053,375 | 10/1977 | Roberts et al. | 204/67 |
| 4,113,832 | 9/1978 | Bell et al. | 423/119 |
| 4,160,808 | 7/1979 | Andersen et al. | 423/119 |
| 4,209,292 | 6/1980 | Rossi | 432/105 |
| 4,312,637 | 1/1982 | Loftus | 48/77 |
| 4,373,908 | 2/1983 | Petit et al. | 432/109 |
| 4,373,909 | 2/1983 | Petit et al. | 432/109 |
| 4,437,419 | 3/1984 | Hertel | 110/259 |
| 4,444,740 | 4/1984 | Snodgrass et al. | 423/483 |
| 4,512,809 | 4/1985 | Nielsen et al. | 106/103 |
| 4,519,814 | 5/1985 | Demarest, Jr. | 65/27 |
| 4,763,585 | 8/1988 | Rickman et al. | 110/346 |
| 4,889,695 | 12/1989 | Bush | 423/132 |
| 4,956,158 | 9/1990 | Nguyen et al. | 423/111 |
| 4,973,464 | 11/1990 | Rickman | 423/461 |

(List continued on next page.)

FOREIGN PATENT DOCUMENTS 1274999  12/1986  U.S.S.R. .............. 423/111

Primary Examiner—Gary P. Straub
Attorney, Agent, or Firm—Douglas G. Glantz; Gary P. Topolosky

[57] ABSTRACT

An industrial waste management facility (IWMF) for disposing of spent potlining includes a co-current gas-fired rotary kiln for containing a molten pool of spent potlining throughout the entire length of the rotary kiln from the inlet to the outlet, an ash quencher and cooler for receiving molten residue from the discharge end of the rotary kiln, a secondary combustion chamber, and a down-draft transition chamber for channeling discharge gases from the rotary kiln to the secondary combustion chamber. Pneumatic injection slingers feed and distribute spent potlining into the inlet end of the rotary kiln. A discharge dam provides a predetermined average depth of molten bath material in the rotary kiln over its entire length. A blended ratio of comminuted materials injected through the pneumatic injection slinger feeder is adjusted and controlled in response to signals received from a radiative optical kiln bath temperature measurement system. The IWMF recovers fluorides from discharge gases exiting the secondary combustion chamber, recycles the fluorides to the molten bath or pool of the rotary kiln, and collects and withdraws glass frit residue from the ash quencher and cooler.

10 Claims, 7 Drawing Sheets

U.S. PATENT DOCUMENTS

| | | | |
|---|---|---|---|
| 4,993,323 | 2/1991 | Tabery et al. | 110/346 |
| 5,020,455 | 6/1991 | Takashi et al. | 110/342 |
| 5,024,822 | 6/1991 | Hittner et al. | 423/111 |
| 5,081,937 | 1/1992 | Ishida et al. | 110/246 |
| 5,086,716 | 2/1992 | Lafser, Jr. | 110/345 |
| 5,100,314 | 3/1992 | Rierson | 432/103 |
| 5,143,001 | 9/1992 | Eriksson | 110/345 |
| 5,164,174 | 11/1992 | Bawker | 423/111 |
| 5,245,115 | 9/1993 | Barrillon et al. | 423/111 |
| 5,286,274 | 2/1994 | Lindquist et al. | 75/10.48 | ically in spent potlining.

ROTARY KILN TREATMENT OF POTLINER

This application is a division of application Ser. No. 08/084,896 filed Jun. 29, 1993.

BACKGROUND OF THE INVENTION

1. Technical Field

This invention relates to a waste management facility for the treatment and disposal of spent potlining, spent from use in the electrolytic smelting of alumina in molten cryolite, by burning and glassification to make the spent potlining residue suitable for reuse or as a non-toxic waste for landfilling.

2. Background

Aluminum has the potential for being the most abundantly used metal in the world. Aluminum oxide itself makes up over eight percent of the solid portion of the Earth's crust. Commercial consumption of aluminum has increased rapidly in modern times, but has not reached the potential available for this multi-dimensional material.

Aluminum metal is produced today by the electrolytic reduction of alumina in a bath of molten cryolite. Commercial scale electrolytic aluminum smelting cells are huge steel tub-like containers. Inside each electrolytic cell is a cathode compartment, or cavity, lined with carbonaceous pre-baked cathode compartment blocks. Thermal insulation is placed between the compartment or cavity lining and the steel shell of the cell. Large steel bars serve as cathode current collectors embedded in the bottom portion of the cavity lining and extended out through openings in the shell to connect with the cathode bus.

The cathode compartment, or cavity, can be relatively large, e.g., such as of dimensions from 12 to 20 inches or more in depth and up to 10 feet wide and 30 feet long, depending on the type of cell and the amperage load for which it is designed. The carbonaceous cavity lining is provided with a depth dimension which can vary, e.g., such as from 6 to 10 inches or more on the sides and from 14 to 18 inches or more on the bottom. It is estimated that no fewer than 13,000 cells or pots of these dimensions are operational in the United States today for producing aluminum commercially.

The carbonaceous cell linings normally last for a long time, but when failure occurs, as from penetration of metal through the cathode compartment blocks which are dissolved, or from penetration of the metal out to the steel shell where it leaks out around the cathode current collectors, the entire carbonaceous cell or potlining is replaced.

In this manner, considerable amounts of spent potlining from the commercial electrolytic smelting of aluminum are accumulated each year and must be disposed. Some estimates have placed the amount of spent potlining from the industrial production of aluminum metal to be 120,000 tons annually.

The carbonaceous material cell linings, which form the bath-holding cavities of the alumina reduction smelting cells for producing aluminum in industrial quantities, become intercalated gradually by the penetration of the smelting cell bath materials, i.e., by penetration of cryolite and alumina. At the high temperatures of the electrolytic reduction smelting process, as the carbonaceous material of the lining gradually ages and degrades over time, it becomes saturated with these bath materials. The carbonaceous lining along with the insulating lining must then be removed. The material removed is called "spent potlining."

The spent potlining cannot be placed in a landfill immediately because of the cyanide content at levels ranging from about 1000 to 2000 parts per million. The spent potlining also has a high content of leachable fluorides at levels, e.g., such as of about 3000–8000 mg/l. Total fluorides present in the spent potlining are at levels ranging typically from about 14% to 18% by weight.

Conventional processes for reducing the fluoride content in spent potlining involve pyrohydrolysis of the spent cell material or potlining, e.g., such as in a fluidized bed reactor. Pyrohydrolysis is a process of contacting a fluidized bed of spent potlining with water or steam to react with the fluoride to form hydrogen fluoride. Sodium fluoride, cryolite, and other sodium compounds in the potlining react with the steam to form hydrogen fluoride vapors and sodium oxide vapors. The hydrogen fluoride vapors and sodium oxide vapors produced in the pyrohydrolysis reactions can be recovered in liquid scrubbers.

Prior methods have used limestone in the form of calcium carbonate to react with the fluorides in the spent potlining at temperatures of about 700° C. to 780° C. to form a calcium fluoride. However, the final product has been found to have moderate levels of leachable fluorides.

Other developmental methods have attempted to remove the fluorides and fluorine balance of aluminum smelting plants by a process wherein the spent potlining is crushed, incinerated, and then pulverized so that fluorides can be extracted into water. After a filtration step, the pulverized material is introduced into a mixing tank, and sulfuric acid and calcium carbonate are added to produce a calcium fluoride. The resulting slurry is desiccated and the sludge is then sent to a disposal site.

The chemical composition of the electrolyte of the alumina reduction smelting bath, which is an important element in the low voltage aluminum production process, contains cryolite and fluorspar (calcium fluoride, $CaF_2$). Accordingly, the large quantities of spent potlining from the industrial aluminum reduction cell linings thereby contain a significant amount of chemical values in the form of carbonaceous material, sodium fluoride, alumina ($Al_2O_3$), a mixture of fluoride salts, and low levels of cyanide.

Several developmental methods have been tried for recovering the chemical values of the fluoride salts and alumina content from the spent potlining material.

U.S. Pat. No. 4,889,695 issued to Bush discloses a process for recovering aluminum fluoride, caustic, and carbon from spent potlining retrieved from an aluminum electrolytic reduction cell. Spent potlining is treated by leaching with a caustic solution to produce a fluoride-rich basic liquor and a carbonaceous solid residue. This is followed by contacting the fluoride-rich basic liquid with an acid bath of aluminum sulfate and sulfuric acid to increase aluminum fluoride product purity from about 53% by weight to about 92%.

U.S. Pat. No. 4,113,832 discloses a process wherein spent potlining is leached with a caustic solution followed by a precipitation of sodium fluoride by saturation of the leach liquor with a compound to suppress the solubility of the sodium fluoride in the leach liquor. The preferred compound is ammonia. Precipitated sodium fluoride is removed, and the leach solution saturated with ammonia is processed to remove the ammonia.

U.S. Pat. No. 4,444,740 discloses a process for removing and recovering fluoride values from spent potlining by leaching with a dilute caustic. The leachate is treated with a calcium compound to precipitate calcium fluoride.

INTRODUCTION TO THE INVENTION

Currently available processes for removing and recovering the chemical values of fluorides from spent potlining or for the pyrohydrolysis of the fluorides are ineffective for disposing of the commercial quantities of spent potlining with fluorides and cyanides present. Prior methods for chemical recovery have been evaluated in attempts to remove and recover the chemical values of the fluorides, but have turned out to be ineffective for disposing of vast amounts of spent potlining. They are ineffective by reason of the additional raw materials necessary to be assigned to the recovery processes and also by reason of the process steps and facilities which must be carried out to remove and recover the fluorides from the commercial quantities of spent potlining produced today. Pyrohydrolysis and other processes for burning or burying the spent potlining, when evaluated in today's regulatory environment, are ineffective to meet the higher standards imposed by solid waste disposal and clean air statutes and amendments.

A recent proposal has suggested commercially treating and disposing of spent potlining using a roasting technique at a temperature of about 650° C. to destroy the cyanides in the spent potlining in the presence of a heavy feed of brown mud of calcium disilicate and limestone. The proposed method does not reduce the graphite effectively in the spent potlining but is somewhat effective in reacting with the fluorides in the spent potlining to produce an ash that has leachable fluorides in the range of about 25 to 200 parts per million.

U.S. Pat. No. 5,143,001 discloses treating spent potlining from aluminum electrolysis cells and stabilizing or transferring leachable substances by heating in a finely ground form with silica, water, and oxygen added in a cyclone furnace. U.S. Pat. No. 4,993,323 discloses treating spent potlining and control of ash chemistry by using specific additives in a vertical, fluidized bed.

U.S. Pat. Nos. 4,956,158 and 5,024,822 issued to Nguyen and Hittner disclose methods of treating and glassifying spent potlining in two kilns or two heating zones. The first heating zone or first kiln includes a heating zone for incinerating the spent potlining to combust the carbonaceous material to form an ash at a temperature low enough to maintain low fluorine vapor pressures. A second heating zone or a second kiln includes the step of heating a mixture of ash and siliceous material to form a glassy residue suitable for landfill.

U.S. Pat. Nos. 5,081,937 and 5,020,455 disclose treating waste material in a molten state. The U.S. Pat. Nos. 5,081,937 and 5,020,455 patents are not directed to spent potlining, but treat pulverized carbonaceous material in a rotary kiln. The patents use multiple zone heating or combustion as by a first step in a combustion furnace to produce an incombustible waste material which then is formed into molten slag.

U.S. Pat. No. 5,100,314, assigned to Svedala Industries, Inc. of Milwaukee, Wis., discloses a device used to inject a reducing agent into a secondary (reduction) zone of a rotary kiln for making contact with pellets advancing through the downwardly inclined rotary kiln. The preferred process directly reduces the pellets without melting the material. U.S. Pat. No. 4,763,585, assigned to Ogden Environmental Services, discloses treating spent potlining from the production of metallic aluminum by grinding, then burning with an additive for coating the ground potlinings to prevent their agglomeration in the combustion zone. U.S. Pat. No. 3,878,287 discloses a rotary kiln including feeding a granular material by means of a gas injection into the kiln. The patent discloses blowing feeder gas from a nozzle into a mixer tube at the inlet of the kiln under a pressure greater than that which prevails in the kiln.

U.S. Pat. No. 3,182,980, assigned to Allis Chalmers of Milwaukee, Wis., discloses a rotary kiln wherein the preheating zone and the reducing zone of kiln are not physically separated. Burner 38 is applied to the discharge end of the kiln. U.S. Pat. No. 4,312,637 discloses apparatus for slag removal from a gasification generator to enhance liquid slag flow from the furnace and to prevent build-up of solidified slag. U.S. Pat. No. 5,086,716 discloses a rotary kiln for burning solid waste including a burner on the discharge end together with a counter-current gas flow in an altogether different feed system. U.S. Pat. No. 4,519,814 discloses burner 46 aimed directly at a discharge material such as glass to maintain the material in molten condition. U.S. Pat. No. 3,508,742 discloses a rotary kiln burner 10 on the discharge end. U.S. Pat. No. 2,878,004 discloses a rotary kiln and burner aimed at the discharge end of the kiln.

U.S. Pat. No. 4,303,908, U.S. Pat. No. 4,303,909, and U.S. Pat. No. 4,209,292 are examples of numerous Allis Chalmer patents relating to the mechanical configuration of a rotary kiln and to mechanisms for feeding combustion gas to the gas jets within the moving portion of a rotary kiln.

It is an object of the present invention to provide an apparatus and method for treating spent potlining containing cyanide and fluoride prior to disposal.

It is another object of the present invention to provide apparatus and method for the disposal of spent potlining which reduces degradation of the environment.

It is another object of the present invention to provide apparatus and method for treating spent potlining from the electrolytic smelting of aluminum in an industrial waste management facility and process of the present invention.

It is another object of the present invention to provide apparatus and method for treating and disposing spent potlining by burning and glassification to make the spent potlining residue suitable for landfill disposal or subsequent use.

It is another object of the present invention to provide apparatus and method for treating spent potlining in a single kiln or single heating zone for reducing carbon content and forming a glassy residue suitable for landfill or subsequent use.

It is another object of the present invention to provide apparatus and method for treating and disposing spent potlining while controlling cyanide, fluoride, and carbon releases to the environment.

It is another object of the present invention to provide apparatus and method for treating and disposing spent potlining in large tonnages from the commercial electrolytic smelting of alumina in cryolite in industrial quantities.

These and other objects of the present invention will become apparent from the detailed description which follows.

SUMMARY OF THE INVENTION

The apparatus and process of the present invention for treating spent potlining from the electrolytic smelting of aluminum include providing for heating spent potlining to an elevated inlet temperature sufficient to form a molten pool of spent potlining, reducing the amount of carbon content in the molten pool of spent potlining, admixing siliceous material either before or after the molten-forming step, and cooling the mixture to form a glassy residue suitable for landfill. In one aspect, the elevated inlet temperature provided for forming the molten pool includes a temperature above 1100° C.

The present invention further includes apparatus and process for providing for admixing an oxygenating compound into the molten pool of spent potlining to form a substantially homogeneous mixture of molten spent potlining and oxygenating compound for facilitating the step of reducing carbon content in the spent potlining while in the molten condition and while maintaining a moisture level less than about 10% by weight. In one aspect, the oxygenating compound includes calcium carbonate.

The present invention includes apparatus and process for forming a molten bath or pool of spent potlining at a depth of at least 24 inches in a rotary kiln. The molten bath or pool in the rotary kiln is provided to be molten throughout the entire length of the rotary kiln from the inlet to the outlet.

The present invention includes apparatus and process for blending spent potlining, siliceous material, and an oxygenating compound in a ratio specified to control the viscosity of the molten mixture.

Feed injection means for injecting reduced particle size spent potlining into the rotary kiln are provided for controlling the volume and distribution of spent potlining fed to a specified area in the rotary kiln. The feed injection invention further includes means for determining the temperature at predetermined locations in the molten bath near the inlet end of the rotary kiln and means for adjusting and controlling the distribution pattern and volume of the spent potlining to provide a specified, even temperature profile in the inlet end of the rotary kiln.

The apparatus and process of the present invention include providing and maintaining the molten bath of spent potlining in the rotary kiln at a specified depth throughout the entire length of the kiln. In one aspect, the invention includes a discharge dam and burners aimed at the discharge dam for facilitating the molten flow of spent potlining over the dam and into the cooling bath for forming the glassy residue suitable for landfill or subsequent use.

In another aspect, the apparatus and process for providing the industrial waste management facility of the present invention for treating and disposing of spent potlining includes a co-current gas-fired rotary kiln for containing a molten pool of spent potlining throughout the entire length of the rotary kiln from the inlet to the outlet, an ash quencher and cooler for receiving molten residue from the discharge end of the rotary kiln, a secondary combustion chamber, a down-draft transition chamber for channeling discharge gases from the rotary kiln to the secondary combustion chamber, pneumatic slinger pipe feeder means for feeding and distributing spent potlining into the inlet end of the rotary kiln, discharge dam means for providing a predetermined average depth of molten material in the rotary kiln over its entire length, a radiative optical kiln bath temperature measurement system, means for comminuting and blending materials prior to injection through the pneumatic slinger pipe feeder means, means for adjusting and controlling a blended ratio of materials in response to signals received from the radiative optical kiln bath temperature measurement system, means for recovering fluorides from discharge gases exiting the secondary combustion chamber, means for recycling the fluorides to the molten bath or pool of the rotary kiln, and means for collecting and withdrawing glass frit residue from the ash quencher and cooler.

DETAILED DESCRIPTION

Figure 1A:
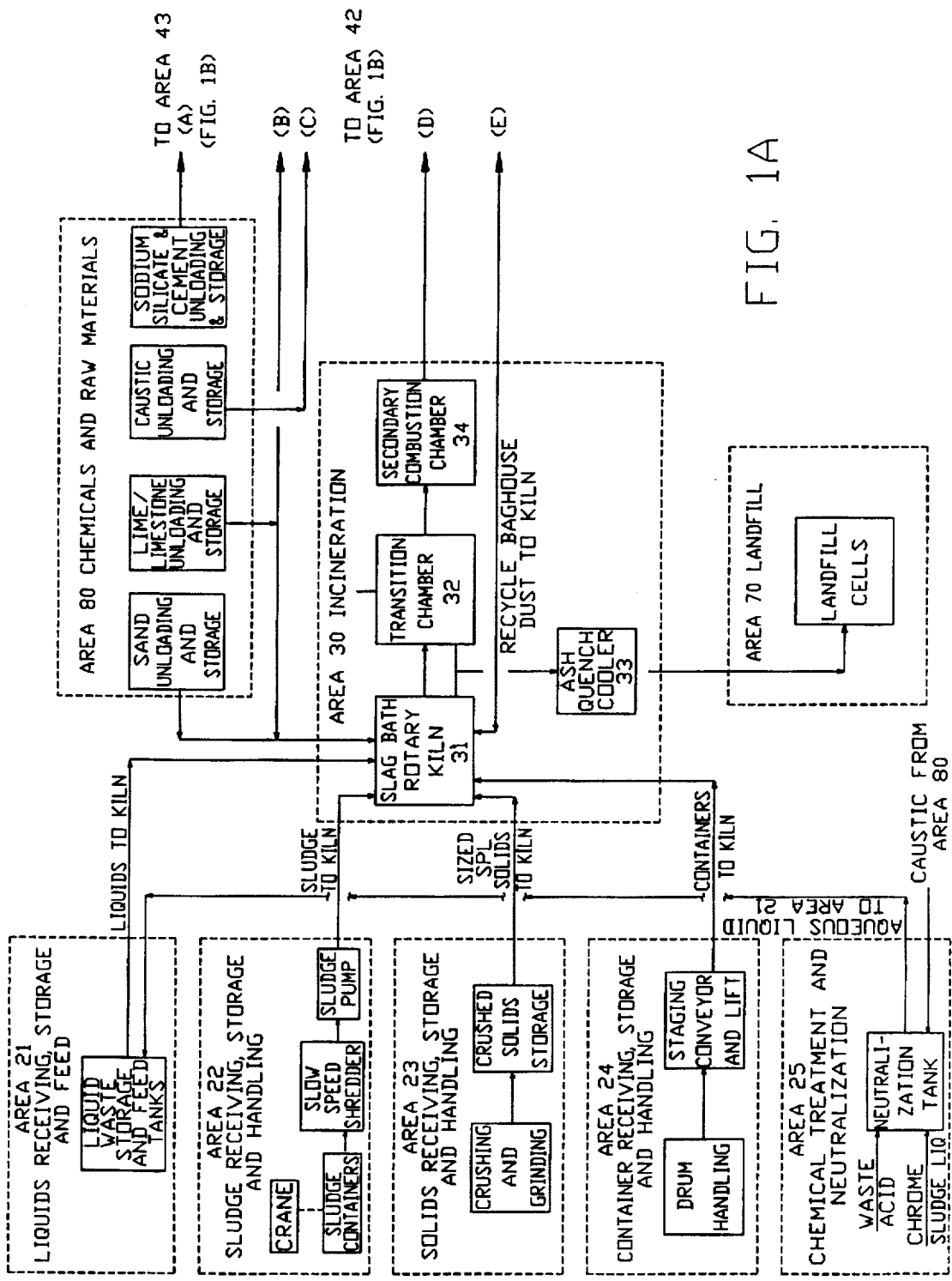
FIGS. 1A and 1B show a schematic process flow diagram for an industrial waste management facility (IWMF) for treating and disposing of spent potlining from the commercial production of aluminum by electrolytic smelting of alumina in cryolite.
Figure 1B:
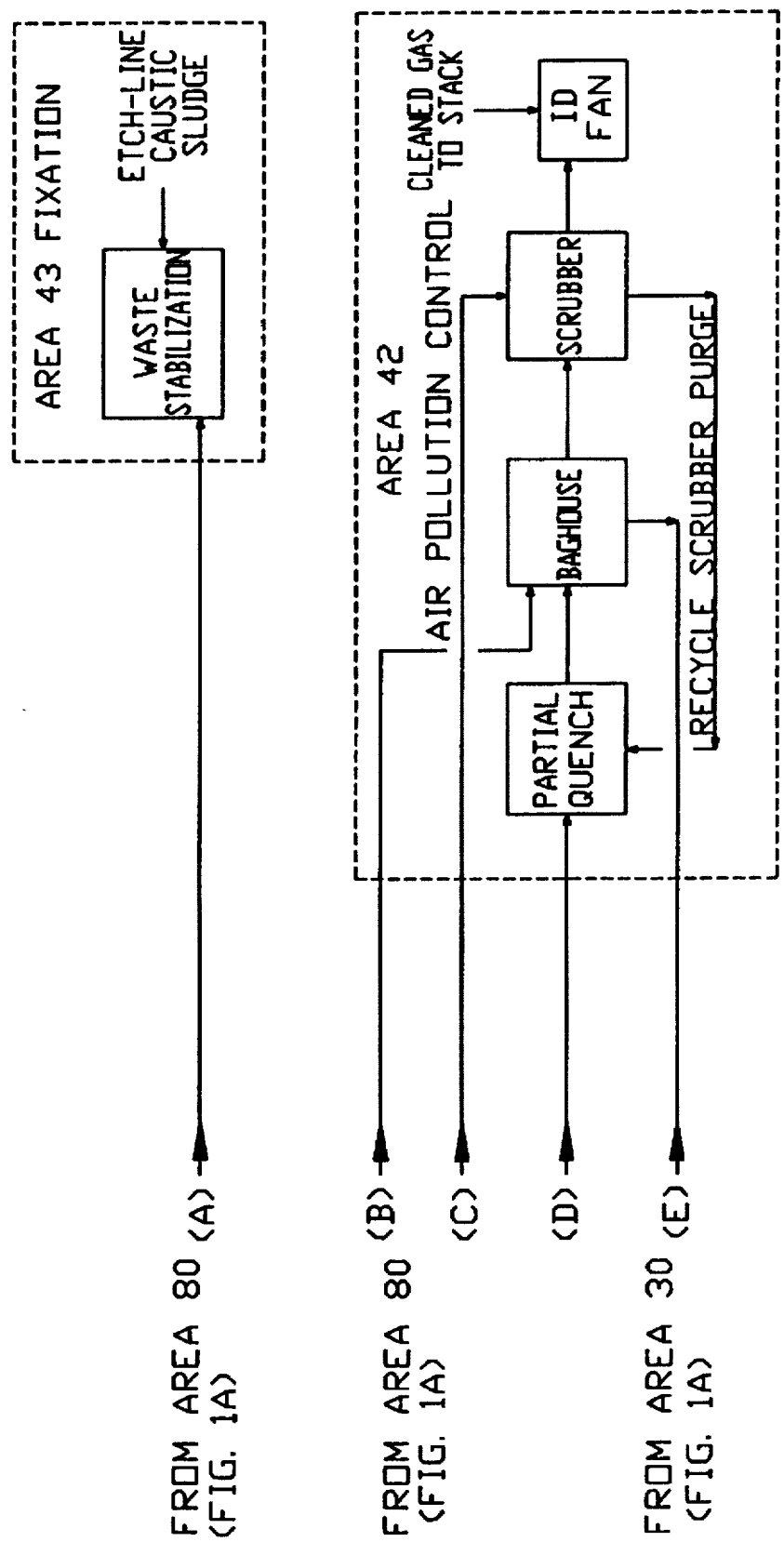

Referring now to FIGS. 1A and 1B, a schematic process flow diagram for an industrial waste management facility (IWMF) is shown for treating and disposing of spent potlining from industrial processes for the commercial production of aluminum by the electrolytic smelting of alumina in cryolite. The industrial waste management facility (IWMF) incorporates the use of storage, chemical treatment, rotary kiln incineration, glass fixation, pozolonic fixation, and secure landfill to treat, store, and dispose of non-hazardous spent potlining waste materials.

FIGS. 1A and 1B show the facility divided into discrete areas. The overall area for material receipt and handling, storage, pretreatment, neutralization, and feed for the incinerator is represented by sub-areas 21, 22, 23, 24, and 25, each devoted to a particular function or type of waste handling.

Incineration area 30 is the overall area for waste treatment by rotary kiln incineration. Incineration area 30 is subdivided into sub-areas 31, 32, 33, and 34, each devoted to a particular function or type of unit operation associated with the rotary kiln incinerator. The sub-areas 31, 32, 33, and 34 include a rotary slagging incinerator kiln area 31, a kiln transition chamber 32, glass fritting system 33, and a secondary combustion chamber 34.

The overall area for environmental unit operations is represented by sub-areas 42 and 43, each devoted to a particular function. The sub-areas 42 and 43 include air pollution control sub-area 42 for the secondary combustion chamber off-gas and waste fixation/stabilization sub-area 43.

A secure landfill area 70 includes double liner leachate collection and a system of ground water monitoring wells to provide protection against potential releases. Landfill area 70 provides for disposal of non-leachable glass frit, stabilized waste material, and other inorganic solids. There are also potential uses for the non-leachable glass frit.

Chemicals and raw materials area 80 consists of chemical and raw material storage.

Figure 2:
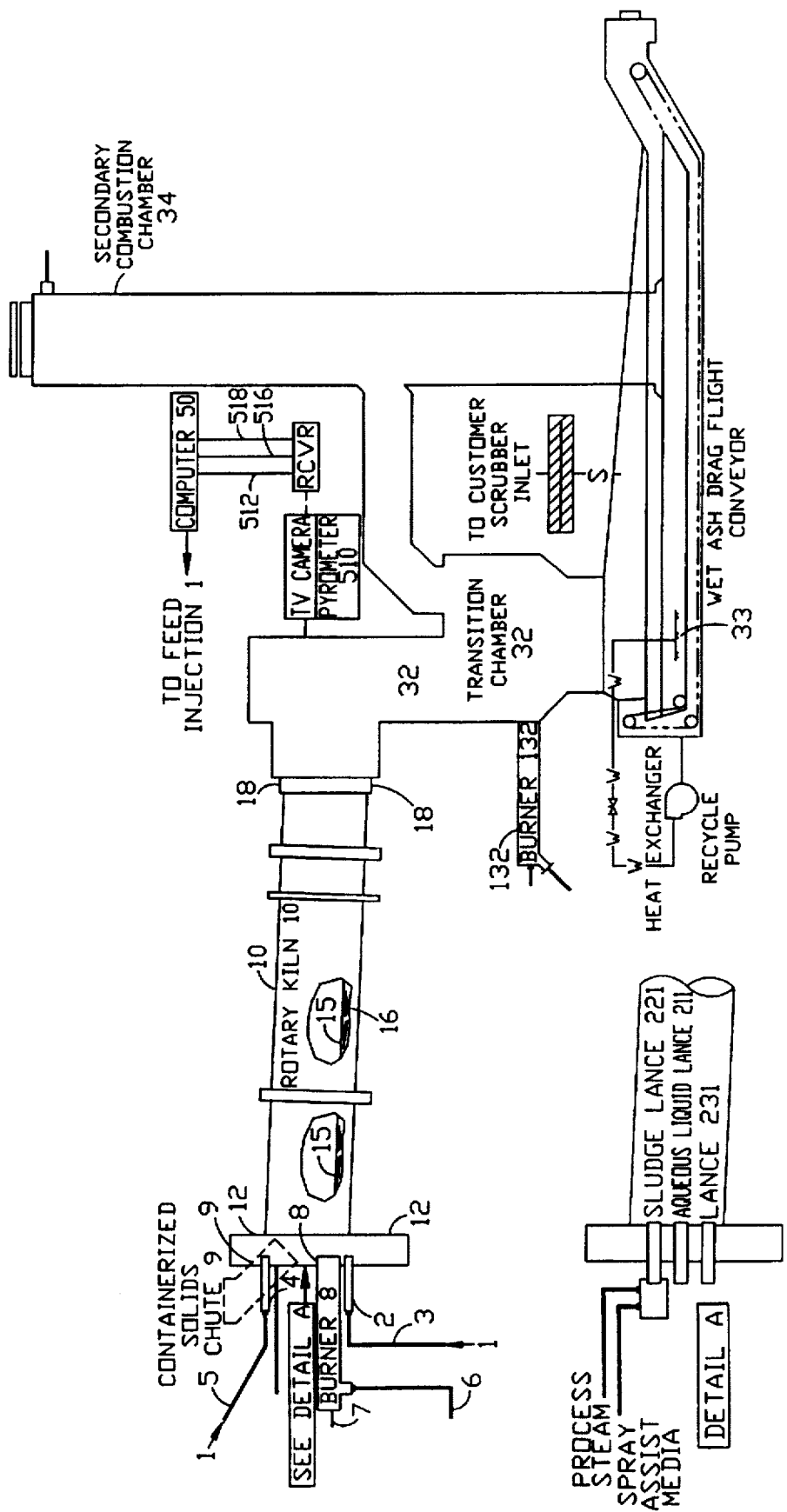
FIG. 2 shows a side elevation schematic view of the apparatus and process of the present invention including a pneumatic feed distribution system, rotary kiln, transition chamber, ash quencher and cooler, and secondary combustion chamber.

Referring now to FIG. 2, slagging bath kiln 10 is provided by a rotary kiln incinerator and melting furnace. Inorganic materials are fed to the inlet end 12 of rotary kiln 10 and are converted to a molten state, while carbon and organic materials are oxidized to carbon dioxide gas and water vapor. Rotary kiln 10 of the present invention operates to melt the feed materials, inorganic and otherwise organic, and to maintain a molten bath or pool 15 within the rotary kiln 10 in a molten state throughout the rotary kiln from the inlet end 12 to the discharge end 18.

The rotary kiln 10 of the present invention facilitates melting the bath and further operates to provide a high level of homogeneity among all constituents in the molten bath or pool 15 within the rotary kiln 10.

The homogeneity of constituents in molten bath 15 provides for an effective use of flux materials, such as calcium carbonate, silica sand, and fluorspar to impart a lower melting temperature and high fluidity to the molten bath at more moderate or readily handled temperature levels.

Such moderated bath temperature levels also suppress volatilization of fluoride compounds, keeping the fluorides in the molten bath, where they ultimately can be fixed in the glassy non-leachable residue product suitable for landfill disposal.

The flux materials and the homogeneity of admixing also facilitate fixing of the fluorides from the spent potlining into a glassy residue when the slag is discharged from the kiln at discharge end 18.

Kiln solids feed 1, consisting of blended spent potlining and flux materials at a particle top size of about ⅜-inch, by way of example in one preferred embodiment, is moved into rotary kiln 10 by slingers 2 and 4. Slingers 2 and 4 can be viewed as continuous pneumatic blow guns, in which solids are entrained in pneumatic streams 3 and 5 directed to the interior molten bath 15 of rotary kiln 10. Air and entrained particles leave slingers 2 and 4 at a velocity of about 3000 feet per minute. In the kiln interior at a low gas velocity, the particles exiting from slingers 2 and 4 in the air stream become de-entrained. Slingers 2 and 4 move material into rotary kiln 10 without protruding themselves physically into the rotary kiln 10.

Kiln main burner 8 is located at the feed end or inlet end 12 of kiln 10. Main burner 8 is capable of producing a long, pencil-like flame, suited to heating the rotary kiln 10 and its associated refractory during start-up, and then to maintaining the molten bath 15 in a molten state during any upset. Accordingly, rotary kiln 10 has co-current heating fired by main burner 8.

Air in line 6 to burn the spent potlining carbon and the main burner fuel in line 7 is brought into rotary kiln 10 through main burner 8. Air to burn the carbon must thereby be in the form of burner "XS" air. By "XS" is meant excess air. Rotary kiln main burner 8 thereby is capable of operation through a wide range of firing rates from about 10 percent to full load, and through a wide range of air-fuel ratios, from about 10 percent to 60 percent "XS" air.

The slag bath rotary kiln area 31 of FIG. 1A includes rotary kiln incinerator and melting furnace 10 as shown in FIG. 2. All inorganic materials fed to the kiln area 31 are promptly converted to the molten state in rotary kiln 10, while carbon and organic materials are converted to the molten state and/or are oxidized to carbon dioxide and water vapor.

Since inorganic materials are melted and maintained in the molten state in rotary kiln 10, a high level of homogeneity among all constituents is attained in the molten bath 15. This homogeneity allows the effective use of "flux" materials, such as calcium carbonate, silica sand, and fluorspar, to impart a lower melting temperature and consequent high fluidity to the molten bath 15 at more readily handled temperature levels. The modest bath temperature also suppresses volatilization of fluoride compounds, keeping the fluorides in the molten bath 15 and ultimately fixed in the non-leachable product.

The flux materials also serve to fix the fluorides from the spent potlining (SPL) into a glass when the slag is discharged from the rotary kiln 10. To improve the effectiveness of glass production, slag is discharged from the rotary kiln 10 into an agitated water 33 bath as discussed in detail hereinbelow. The slag falls into the water bath 33, promptly breaks up into frit at about 0.12 inch particle size, and cools rapidly. The rapid cooling controls against formation of crystals, maintaining the solid in the true state of a glass, without any crystal structure. The non-crystalline state controls to provide an absence of grain boundaries and extra resistance to leaching.

Kiln feed solids (SPL, sand, $CaCO_3$, and baghouse purges) are delivered to rotary kiln 10 from various plant areas. Rotary valves are used to feed materials from hoppers (not shown) to pneumatic conveying lines 3 and 5 serviced by slinger blowers which move the blend into the kiln via feed injection slingers 2 and 4. The feed injection slingers 2 and 4 are continuous pneumatic blow guns, in which the solids are entrained in the air stream directed to the rotary kiln interior.

The air and entrained particles leave the slinger guns 2 and 4 at a velocity of about 3,000 feet per minute. In the kiln interior, where gas velocity is low, the particles become de-entrained. The slingers 2 and 4 move material into the rotary kiln 10 without protruding themselves into the rotary kiln 10.

The rotary kiln burner 8 and other material handling devices, including sludge lance 221, aqueous liquid lance 211, and lance 231, which move materials to the kiln 10 interior, as shown in Detail A of FIG. 2, also do not protrude into the kiln 10 interior, thereby to control against a tendency to accumulate and freeze molten slag, which drips continually from the kiln refractory as the rotary kiln 10 rotates. Otherwise, such an accumulation and freezing process on structures protruding into the kiln would continue to build up to unmanageable levels.

The kiln burner system is located at the feed end of the rotary kiln. The kiln main burner 8 is capable of producing a long, "pencil-like" flame, suited to heating the entire kiln and refractory during start-up and, thereafter, to maintain the bath 15 in the molten state during upset. This main burner system preferably is fueled by natural gas.

The kiln main burner 8, two slingers 2 and 4, three sludge/liquid waste lances 221, 211, and 231 (shown and identified in Detail A), and a containerized waste feed chute 9 are located at the rotary kiln feed end 12, mounted on the feed end housing. The geometry or structure of the kiln feed end 12 is such that no elements protrude into the kiln interior, with the structure of each tip, or "hot end," located slightly back from the lip of a rotary kiln feed end dam as discussed in detail hereinbelow. An aqueous liquid lance 211, an organic liquid lance 231, and a sludge lance 221 (all shown in Detail A) feed various wastes to the kiln. The sludge lance 221 requires steam to ensure proper flow characteristics.

In one specific preferred embodiment, the rotary kiln 10 of the IWMF of the present invention is structured to have a working length of about 80 feet and a working diameter of about 15 feet. Other dimensions of the preferred embodiment are shown in Table 1.

TABLE 1

Rotary Kiln Geometry

| Form: | Cylindrical, horizontal centerline |
|---|---|
| Working diameter, feet | 15.00 |
| Refractory thickness, inches | 12.00 |
| Shell diameter, feet | 17.00 |
| Cross sectional area, ft$^2$ | 226.98 |
| L/D ratio | 5.33 |
| Working length, feet | 80.00 |
| Working length, ft$^3$ | 13,618.80 |
| Nominal load, % | 10.00 |
| Bath depth at centerline of load, % of radius | 31.30 |
| Bath depth at centerline of load, inches | 28.20 |
| Feed end dam diameter for 2.0 inches freeboard, inches | 119.00 |
| Bath volume, ft$^3$ | 1,413.70 |
| Bath nominal residence time, hours | 6.82 |

A preliminary design parameter of length to diameter (L/D) ratio of 3.53 for the rotary kiln unit, chosen cooperatively to attain a design gas velocity of about 1,500 feet per minute while maintaining a volumetric heat liberation rate of about 17,500 Btu per hour per cubic foot, has been found to cause exceptional levels of stress in the kiln sections between the riding rings and the ends. Substantial deformation must be accommodated at the riding rings. The kiln ends, with their conical or ring geometry, are very stiff. The only solution was to increase L/D ratio.

The transition chamber 32 and ash quencher/cooler area 33 form a rectangular refractory firebox with water bath in process communication with the slag bath rotary kiln 10 and the secondary combustion chamber 34 (SCC).

The transition chamber (TC) system area 32 is shown identified in process communication with the kiln discharge end housing 18. The TC 32 functions to de-entrain particulate in the kiln off-gas. De-entrained particulate will tend to impact upon the rear wall of the chamber 32 and stick to the refractory, becoming molten and being fluxed to flow down into the quencher. The interior walls of this transition chamber 32 must be maintained at a temperature above or about equal to that of the molten bath 15, so that molten material does not freeze and build up on the transition chamber 32 walls.

The transition chamber 32 (TC) is structured as an upside-down box and supported above its centerline, with side walls extending down into the water bath of the ash quencher 33. Kiln off-gas flows into the TC 32, turns downward, turns to the side toward the secondary combustion chamber 34 (SCC), and then flows through a duct to the SCC 34. Expansion of the kiln 10 is accommodated by seals (not shown), which allow the rotary kiln 10 to expand axially and radially into the TC 32. Expansion of the TC 32 is accommodated by these seals, by an expansion joint (not shown) in the duct to the SCC 34, and by allowing the TC 32 walls to expand down into the water bath of the quencher 33. This structural expansion geometry directs the hot kiln gas to flow past the face of the discharge dam at discharge end 18 of rotary kiln 10, as discussed in detail hereinbelow, keeping it hot, and any incidental air leak-in sites are below and beyond the point where leaking air will chill a refractory surface and cause an unwanted freezing of the slag in its path to the water bath 33. This structural geometry causes the water vapor formed in the cooling of the slag to be entrained in the rotary kiln 10 off-gas beyond the point where it would chill refractory surfaces or the slag.

There is no torch in the TC 32, but rather a full sized windbox—register burner 132 provides a gas-fired heating with a rating of 30 million Btu per hour. This TC 132 burner produces an intense, compact flame, suitable to maintain the temperature levels of all refractory surfaces in the TC 32, including the face of the kiln discharge dam, at temperatures well above the slag melting point. During normal operation, the kiln off-gas will be at a temperature level above the bath temperature, so the TC burner 132 will be idling at, e.g., a 10% load. When there is an upset and kiln off-gas flow is at a reduced flow or at a reduced temperature, the TC burner 132 may be brought to full fire.

In one preferred embodiment, the TC 32 is structured in the form of a parallelpiped of about 21 feet in length. Other dimensions of the TC 32 in one preferred embodiment are shown in Table 2.

TABLE 2

Transition Chamber (TC) Geometry

| Form | Parallelpiped (box) |
|---|---|
| Length (inside refractory), feet | 21.0 |
| Width (inside refractory), feet | 21.0 |
| Plan view working (inside refractory) area, ft$^2$ | 441.0 |
| Refractory thickness, inches | 12.0 |
| Length/width of shell, feet | 23.0 |

The ash quencher/cooler 33 is a submerged drag conveyor, water bath quencher. A water bath is maintained underneath the TC 32. The TC walls extend down into the water bath 33 to provide a seal against air in-leakage. Molten glass falls into the water bath 33 where it is quenched quickly to form a glass frit. The energy removed in solidifying and cooling the molten glass material is transferred to the water to form water vapor.

The cooler 33 is a horizontal box, with an inclined section at one side, perpendicular to the rotary kiln 10 centerline. The drag conveyor as shown and identified in FIG. 2 moves the frit toward the inclined side, then up the incline, out of the water bath 33. Excess water drains from the solids back into the bath, leaving water on the surface of the frit and in its voids. The frit leaves the water bath cooler 33 with about 10% moisture content, at a temperature of about 80° C.

The water bath cooler 33 is fitted with a recirculation pump and heat exchanger as shown and identified to cool the water, and an array of jets, which serve to stir the water bath 33 vigorously. These features reduce the water bath temperature and reduce the hazard of a steam eruption should a large, hot chunk of refractory fall into the water bath cooler 33. Since some heat is rejected through the heat exchanger, the mass flow of water vapor into the SCC 34 and off-gas system is reduced with less chilling of kiln 10 off-gas, less fuel consumption in the TC burner 132, and less capacity requirement in the SCC 34 and other downstream equipment. The stirring effect also enhances the production of fine frit and accelerates the cooling of the glass, increasing the control against crystal formation.

The secondary combustion chamber (SCC) 34 receives off-gas from the transition chamber 32 and ash quench cooler 33 and discharges to a partial quench unit operation (as shown in the process flow schematic of FIG. 1A). Hot particulate will impinge on the wall of the secondary combustion chamber 34 and may turn into slag. The base of the chamber is submerged in the transition chamber 32 and ash quencher/cooler water bath 33. Slag which drains into this cooler water bath 33 will be quenched and removed by a glass frit conveyor, as shown, as a solid.

In the SCC 34 geometry, gas leaves the SCC 34 in a horizontal duct near the top. The bottom of the SCC 34 is structured to communicate with the transition chamber 32 and slag quencher 33. Some material build-up will occur on the SCC 34 and transition chamber 32 walls. Kiln off-gas, including air leakage and cooler water vapors, must be heated to 1300° C. to provide that slag drains in a fluid state into the cooler water bath 33. Seals (not shown) in all parts of the SCC 34 limit air infiltration.

The SCC 34 preferably is positioned on top of the transition chamber 32, and kiln off-gas enters directly. No main burner is required, since gas is already at temperature when leaving rotary kiln 10. Burners are required to heat the kiln discharge end dam in hot gas, as discussed in detail hereinbelow, and to heat the water vapor evolved from the cooler water bath 33, to keep the slag in the molten state and at a high level of fluidity, while draining over the discharge end dam at discharge end 18 of rotary kiln 10.

In one preferred embodiment, the SCC 34 is structured to be 80 feet in working height and over 15 feet in shell diameter. Other dimensions of the SCC 34 in one preferred embodiment are shown in Table 3.

TABLE 3

| Secondary Combustion Chamber (SCC) Geometry | |
| --- | --- |
| Form: | Cylindrical, vertical centerline |
| Working diameter, feet | 13.5 |
| Working cross-sectional area, ft$^2$ | 143.1 |
| Refractory thickness, inches | 12.0 |
| Shell dia., feet | 15.5 |
| Working height, feet | 80.0 |

(Working height is defined as the elevation difference from the centerline of the entrance duct at the bottom to the centerline of the exit duct at the top.) Refractory - two component refractory total 12" on radius. Hot face to be high density Al$_2$O$_3$.

Spent potlining burns in the rotary kiln 10 and mixes with siliceous material, e.g., such as by way of example, SiO$_2$ sand. Spent potlining having reduced carbon content and blended with SiO$_2$ sand exits the discharge end 18 of rotary kiln 10 and is passed to transition chamber 32 and ash quencher and cooler 33.

Discharge gases from discharge end 18 of rotary kiln 10 contain fluorides which are recovered in fluoride recovery unit as shown in FIG. 1B in area 42 and then are recycled to rotary kiln 10. Fluoride recovery unit area 42 in a preferred embodiment includes one unit operation provided by a lime-coated bag filter as shown and identified as a baghouse in area 42 of FIG. 1B.

The industrial waste management facility and process of the present invention (IWMF) provide an overall apparatus and process system for treating spent potlining by incineration in rotary kiln 10 having a "single-zone heating." The rotary kiln 10 incinerates the potlining as a molten bed 15. The spent potlining is 100% molten from the front inlet 12 to the rear exit 18 of the rotary kiln 10. Operating the entire rotary kiln 10 with spent potlining in a molten material condition is novel.

Apparatus and method within the overall IWMF and process system include apparatus and process steps to remove fluorides in the discharge gases from the kiln exhaust to control release into the atmosphere. Fluorides thereby are contained within the IWMF apparatus and process system and are returned to the spent potlining molten bath 15 to be converted to a glassy residue in the rotary kiln 10, resulting in controlling release of fluorides from the discharge gases into the environment.

Certain embodiments of the present invention have derived from a recent program for the development of the novel spent potlining incinerator/rotary kiln and industrial waste management facility (IWMF). The present invention includes an air slinger system for spreading spent potlining in the form of a feed distributed over a substantial portion of the molten slagging surface in the inlet end 12 of the rotary kiln 10 and further includes a discharge dam system for maintaining free-flowing molten slag material movement at or near the exit or discharge end 18 of the rotary kiln and into the water cooling tank 33, as well as the present invention of an overall industrial waste management facility system for treating spent potlining in a continuous "one-zone heating" zone.

Figure 3B:
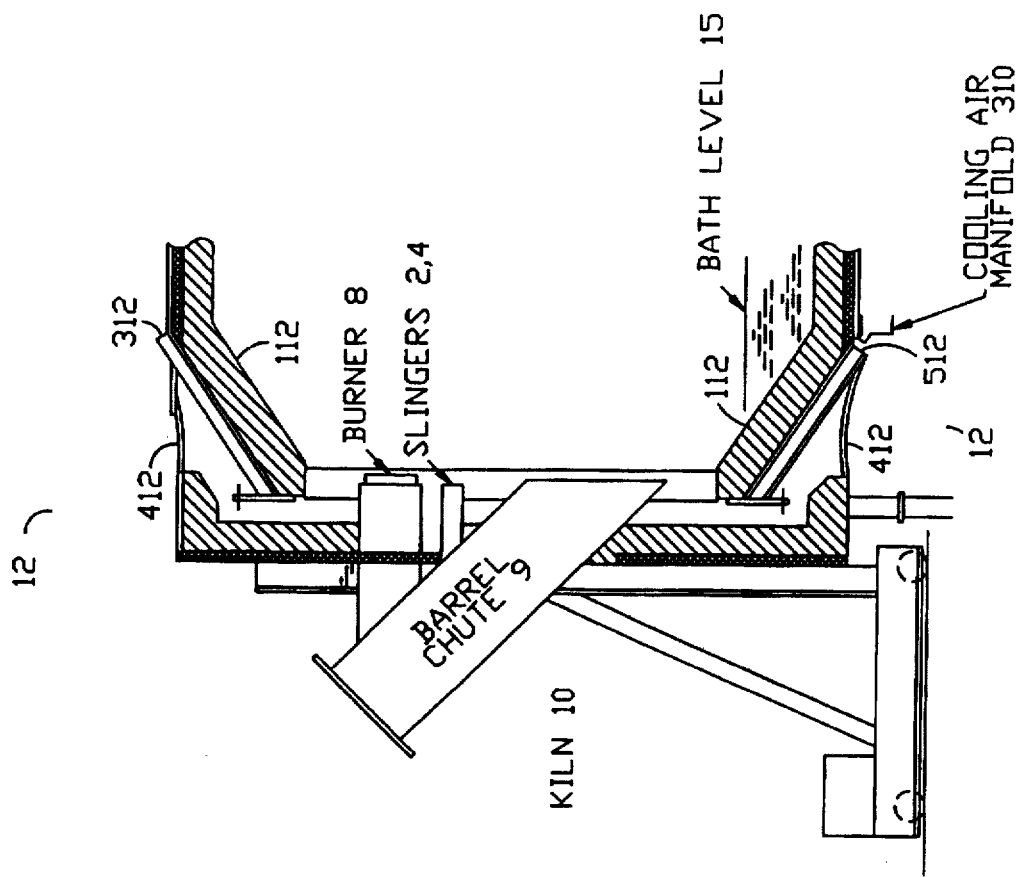
FIG. 3A shows a front elevation view and FIG. 3B shows a side elevation sectional view of the feed end of the rotary kiln of the present invention.
Figure 3A:
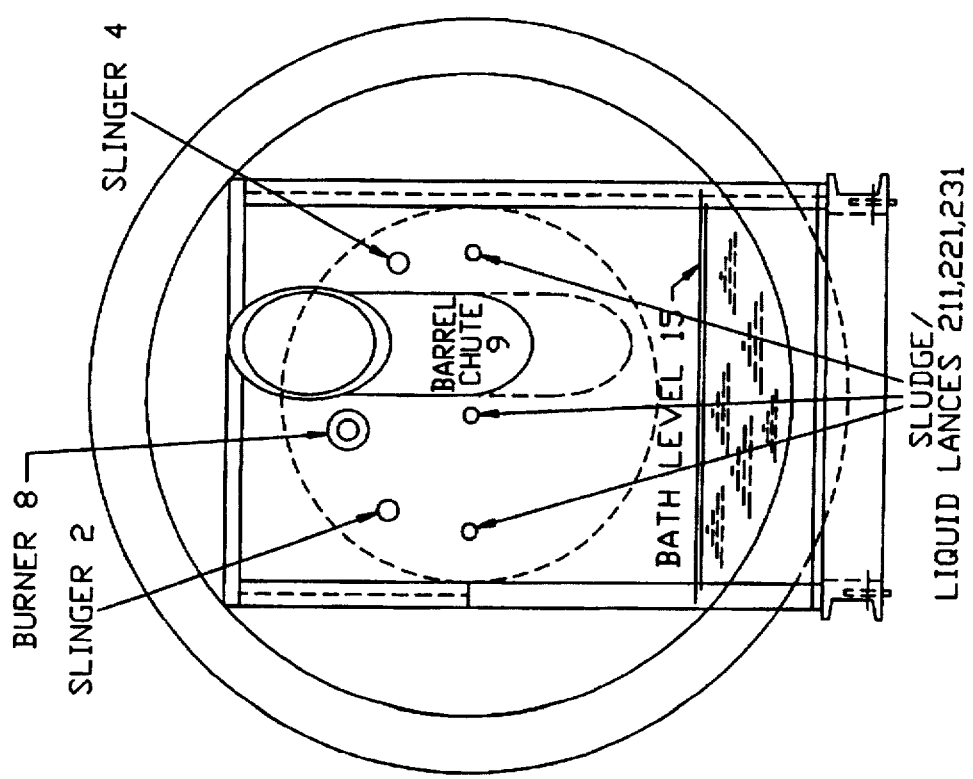

Referring now to FIG. 2 and FIGS. 3A and 3B, the air slinger system invention spreads feed of pulverized spent potlining over a substantial portion of the inlet end 12 of the rotary kiln 10. The air slinger system in one aspect operates by pneumatic injection. A feed 1 for crushed or pulverized spent potlining is connected to a slinger pipe 2 or 4. Slinger pipe 4 is angled from the horizontal to a downward angle, i.e., in one embodiment (not shown), such as thirty degrees from the horizontal. The air slinger system, as used with the molten slagging surface rotary kiln for incinerating and treating spent potlining, spreads or distributes the spent potlining through slingers 2 and 4 as a feed over a substantial portion of the molten slagging surface 15 in the rotary kiln 10 so that graphite can burn or incinerate over a large area and the slagging surface can be maintained in a molten state.

Figure 4:
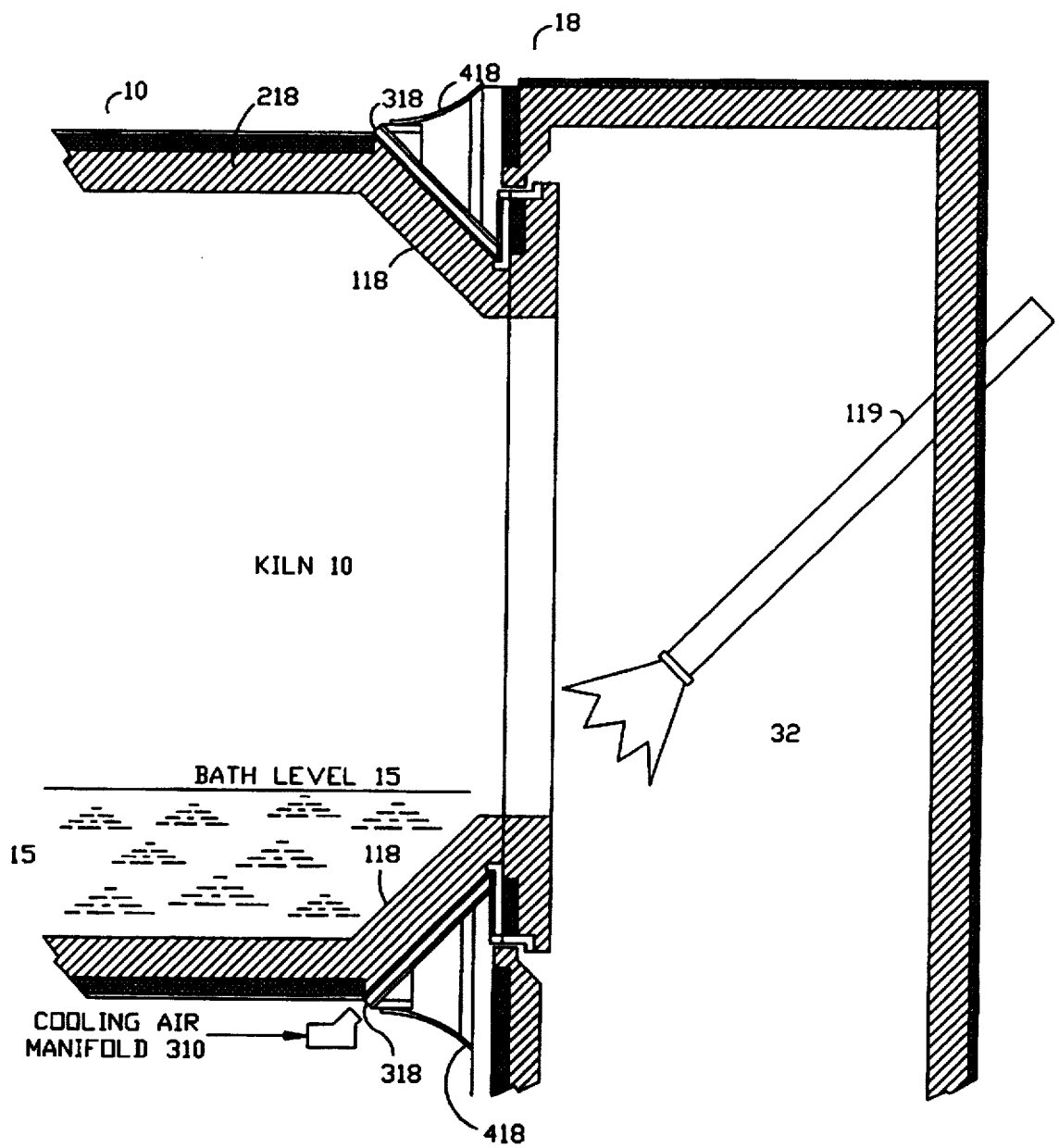
FIG. 4 shows a side elevation sectional view of the discharge dam end of the rotary kiln of the present invention.

Referring to FIG. 4, a discharge dam 118 provides for and facilitates molten material movement so that the slagging surface of the rotary kiln 10 will remain free-flowing over the 118 dam and the discharge or exit end 18 of the rotary kiln 10 and into the water cooling tank. Also, the exhaust gas from the rotary kiln is directed down to the water bath through transition chamber 32 as the slagging flow leaves the rotary kiln 10. The discharge dam 118, in one embodiment, can be provided by a structure having a width of about two feet and a depth of about one foot across the exit end of the rotary kiln 10.

The discharge dam invention provides combustion burners 119 angled downward and aimed at discharge dam 118 positioned at the exit end of the rotary kiln.

A feed end dam 112 associated with the discharge end dam 118 and retaining means of the present invention is shown in FIG. 3B.

The discharge end refractory 218 is retained in a conical section with refractory retaining pieces. Leakage of atmospheric air into the kiln is limited by use of seals 412 and 418 at both ends of rotary kiln 10. Cooling air from cooling air manifold 310 is blown into the cooling air shrouds 312 and 318 to keep the metal temperature in the ends at a level where metal deformation and growth is limited. The cooling air does not enter the kiln or the space inside the seals, because there is a full 360° ring which is welded to the conical end section. Refractory retaining segments are bolted to this ring.

A loaded area fraction was initially designed into the rotary kiln 10 at a 15% level of "fillage" believed suitable for the IWMF apparatus and process. The loaded area fraction was set to make available a large surface area on the molten bath slagging surface and in contact with the refractory walls. It was discovered that the rotary kiln 10 was so large that problems with stress levels in the ends 12 and 18 were found to require a change to a 10% loaded area fraction to improve process parameters. The rotary kiln 10 can operate at lesser load levels, i.e., less than 10% loaded area fraction, providing that the molten bath 15 volume is sufficient to achieve melting and homogenization of the spent potlining (SPL) and flux materials.

The slope of the rotary kiln 10 was "tipped" further toward the discharge end 18, so as to provide a molten bath 15 whose surface was not parallel to the rotary kiln 10 center line, which was the baseline condition. This tipping caused a reduction in molten bath 15 volume and molten bath 15 residence time, with the goal of reducing time for volatilization or vaporization of fluorides.

Bath residence time in the rotary kiln 10 may be controlled by "aiming" the slinger 2 or 4 to cast the feed further into the rotary kiln 10. The portion of the molten bath 15 near the feed end 12 then serves functionally as an "idling" hot reserve, since negligible back mixing of molten bath 15 occurs because of the molten bath 15 viscosity.

The present invention provides apparatus and process for providing, and continuously monitoring and controlling, a predetermined temperature profile in the molten bath or pool 15 in the rotary kiln 10. The molten pool 15 in the rotary kiln 10 first is heated to a specified initial temperature, and temperatures are monitored at a plurality of locations along the length and width of the molten pool 15 of the heated potlining and flux materials. The temperature of a specified portion of the heated molten pool 15 then is adjusted by controlling the distribution and volume of feed materials injected into the inlet end of rotary kiln 10 by the air slinger feed system. The temperature of the molten pool 15 is monitored at a plurality of locations along its length and width. Monitoring is performed by sensor signals sent from a radiative optical temperature sensing system 510 shown in FIG. 2 focused on a plurality of specific locations of the molten pool 15 inside the rotary kiln 10. The sensor signals are recorded over time, and a temperature profile is plotted to show the temperature change from the plurality of specific locations of the molten pool 15 inside the rotary kiln 10.

The present invention further includes providing a comparison between (1) a reference value for a preferred temperature profile for a specific, predetermined molten pool of spent potlining composition versus (2) the actual temperature profile over the molten pool 15 subsisting in the rotary kiln 10 in real time. The feed volume and distribution of comminuted spent potlining injected into the rotary kiln 10 through the air injection system then is controlled in response to the comparison of the preferred temperature profile versus the actual temperature profile.

Accordingly, the apparatus for providing, and monitoring and controlling, the predetermined temperature profile in the molten pool 15 includes means for heating the potlining in the rotary kiln 10, a first temperature sensing means located in at least one location of the molten bath 15 comprising spent potlining in the rotary kiln 10, a second temperature sensing means at a separate portion of the molten pool 15, means for comparing signals sent from the first and second temperature sensing means to form a temperature profile along the length and width of the molten pool 15, and means for controlling the volume and distribution of comminuted spent potlining feed materials injected into the inlet end 12 of the rotary kiln 10 to obtain and maintain the predetermined temperature profile. The first and second temperature sensing means, in one embodiment, are provided by a radiative optical temperature measurement system, but other embodiments can include temperature measurement systems such as are provided by thermocouple sensor signals positioned in the molten bath 15 of the rotary kiln 10.

A computer 50 is provided for comparing signals sent from the first and second temperature sensing means to form a temperature profile along the molten bath 15 in the rotary kiln 10. The computer then is controllably linked to send command signals to the means for injecting spent potlining feed into the rotary kiln 10 relative to the gas fired co-current heating source to obtain and maintain the predetermined temperature profile.

In one aspect, the present invention provides apparatus and process for establishing, and continuously monitoring and controlling, a specified temperature profile in the molten bath 15 in the rotary kiln 10 of reductions or increases of the temperature profile along the length and width of the molten bath 15 in a continuous manner.

The present invention measures and monitors temperature, determines temperature profile, and adjusts the localized heating and cooling to change the molten bath 15 temperature profile in response to the temperature measuring and monitoring determination. The invention thereby provides a continuous monitor and control of the temperature profile of the molten bath 15. By measuring the magnitude of change of the temperature profile, the amount of heating and the amount of conductive/convective cooling on the molten bath 15 can be quantified by reference to a specified standard for the desired temperature profile. Radiative optical sensor signals 512, 516, and 518 measure the temperature of the molten bath 15. The radiative optical sensor signal 512 measures the temperature at or near inlet end 12 of the rotary kiln 10. The radiative optical sensor signal 516 measures the temperature at or near the periphery 16 of rotary kiln 10, and signal 518 measures the temperature of the molten bath at or near discharge end 18 of rotary kiln 10.

Temperature readings or sensor data measured and received from radiative optical sensor signals 512, 516, and 518 are sent to a data logger unit in the apparatus and process of the present invention. Data from radiative optical sensor signals 512, 516, and 518 are received and recorded by the data logger unit. The collected data from the data logger then is sent to and correlated at the computer shown in FIG. 6.

The computer 50 (FIG. 2) analyzes the actual temperature profile determined from real time data, including comparing the temperature profile against a reference standard or predetermined temperature profile desired for the specific bath composition used in the current rotary kiln incineration operation. The computer 50 can present a plot of the temperature profile in the molten bath as shown in FIG. 5.

The computer 50 sends a signal or signals to the feed injection system 1 which injects ground spent potlining into rotary kiln 10 through air slinger 2 or 4 to load or unload the temperature profile in the rotary kiln 10.

Figure 5:
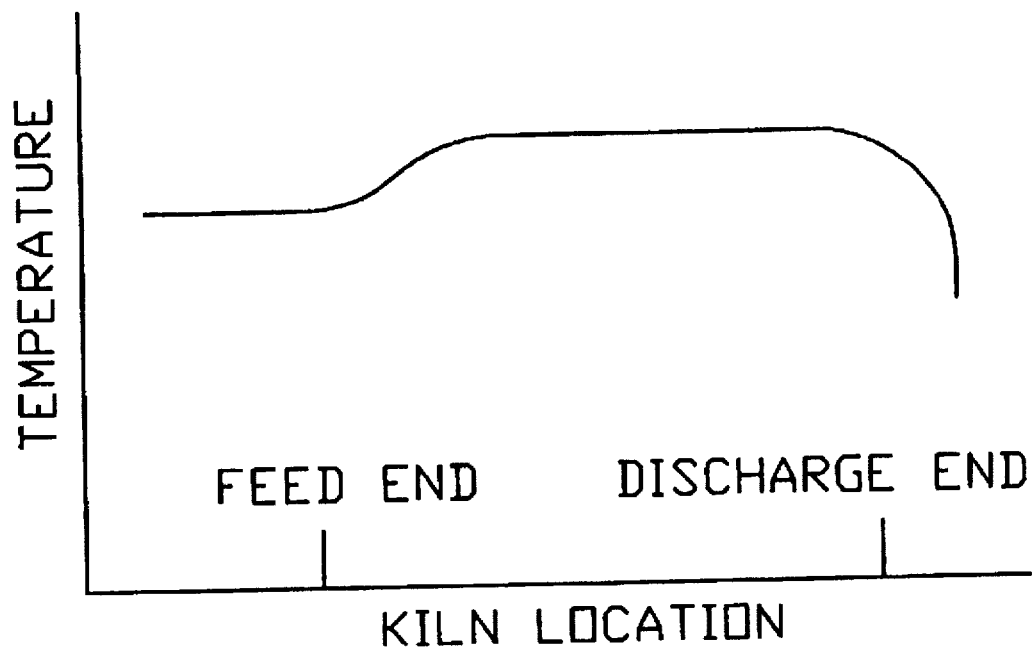
FIG. 5 shows a temperature profile for a specified temperature distribution from the feed end to the discharge end of the rotary kiln of the present invention.

A plot of temperature profile by the computer can provide a graphical analysis as shown in FIG. 5. A plot of actual temperature profile versus a specified reference temperature profile can be viewed for the molten bath 15 in real time. The comparison is provided by plotting the actual temperature profile versus a predetermined, set temperature. The desired difference then is calculated and analyzed by the computer in such a way to adjust the volume and distribution of feed to the rotary kiln 10 in response to the computer comparison and analyses of data received from the data logger as discussed in relation to FIG. 6.

Figure 6:
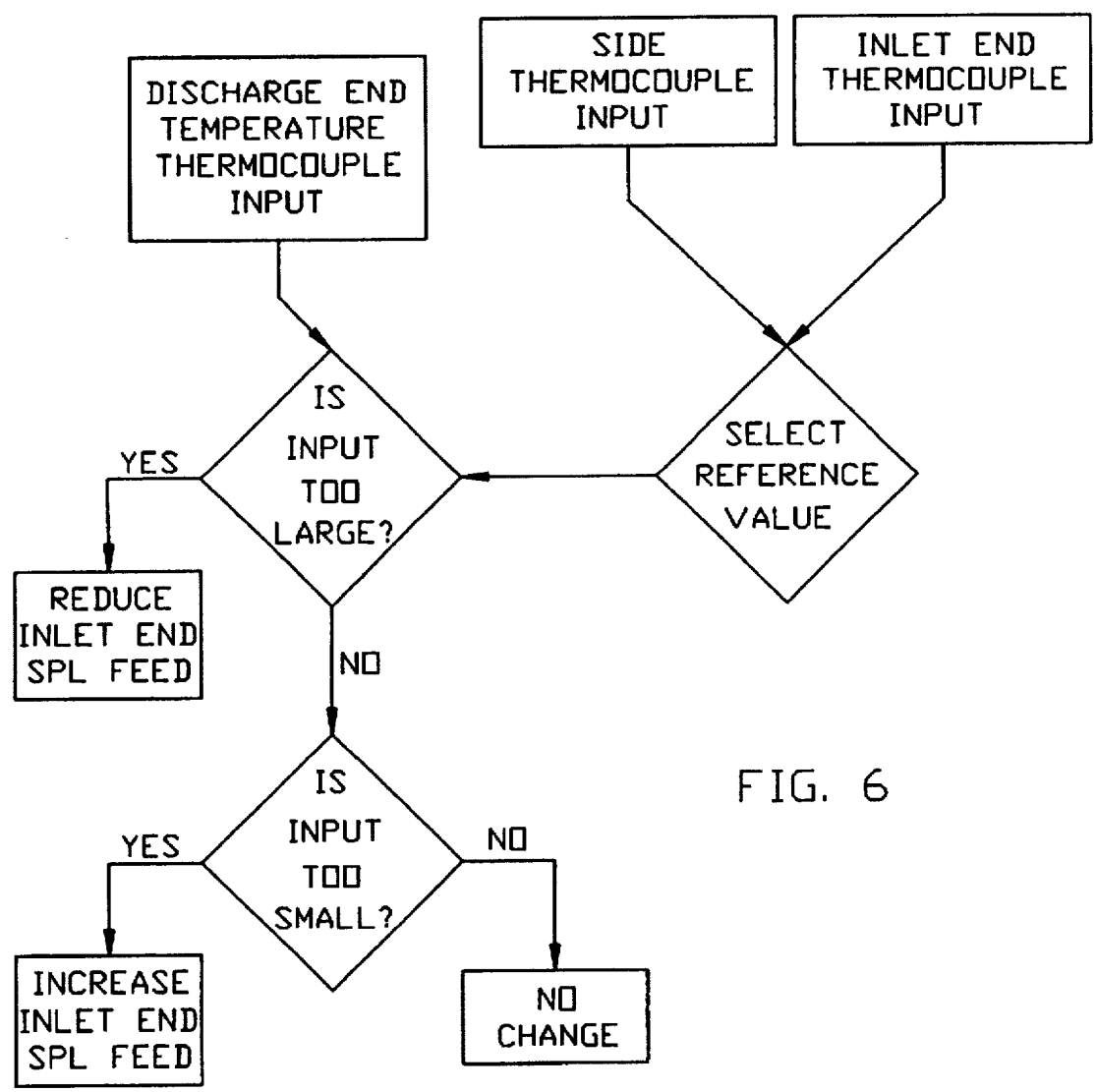
FIG. 6 depicts a logic and process flow diagram showing decisions of the process in controlling the temperature profile in a molten bath of spent potlining in accordance with the present invention.

FIG. 6 presents a logic and process flow diagram showing decisions of the process for controlling the temperature profile of the molten bath 15 in accordance with the present invention. Essentially, the procedure followed in the process includes the steps of inputting the sensor signals from the radiative optical sensor signals 512, 516, and 518, respectively, as shown in FIG. 2 into the microprocessor, comparing the sensor signals, and determining if the difference is larger than the reference value stored in the microprocessor, while factoring in the temperature value coming in from the bath temperature radiative optical sensor signals 512 for the inlet end location 12 and 516 for the periphery or side end location 16 of the rotary kiln in relation to the sensor signal 518 for the discharge end. If the comparison is larger than the reference signal, a command signal is sent to the feed injection system as shown in FIG. 2. If the comparison is not larger than the reference signal, the microprocessor determines if the comparison is smaller than the reference value, and if so, a command signal is sent to the feed injection system to inject more carbonaceous material into rotary kiln 10. If the input signal is not smaller than the reference signal, no command signal is sent to the feed injection system.

The apparatus and process of the present invention provide a specified temperature profile in a molten bath in a rotary kiln to establish and maintain a true temperature profile, to match the preferred specified temperature profile as shown in FIG. 5.

The apparatus and process of the present invention preferably produce a specified temperature profile to produce a carbon reduction in the spent potlining caused by a temperature gradient in the molten bath 15, so that the spent potlining is incinerated to an ash suitable for encapsulation into a glassy residue.

The present invention provides a real-time sensor for measuring and monitoring the temperature of the molten bath 15 and then determining the temperature profile of the molten bath 15. The invention provides for monitoring and controlling the temperature profile of a molten bath including rapidly heating a feed on ground spent potlining to a carbon reducing set point while not exceeding a maximum fluoride generation temperature in a rotary kiln production furnace and then matching a specified temperature profile, thus to provide for the treatment and disposal of spent potlining from the electrolytic smelting of aluminum at efficient disposal rates.

Referring back to FIGS. 1A and 1B, waste material that is to be fed to the overall incinerator system area 30 of the IWMF can be staged through the material receipt and handling areas. Liquid receiving, storage, and handling area 21 provides unloading, storage, blending, handling, and feeding of all bulk liquid receipts, including waste oils, acids, caustic, aqueous waste, and inorganic liquids. The necessary tankage and blending flexibility is provided to control wastes fed to the kiln as having combustion characteristics needed for maximum destruction.

Liquids area 21 receives liquid aqueous, organic, and inorganic wastes in bulk. After sampling, the material is unloaded, segregated, and stored in storage tanks in accordance with its chemical composition and compatibility with similar waste. The liquids then are mixed and blended in agitated tanks so that a homogenous waste with desirable combustion characteristics is fed to the incinerator.

Sludge receiving, storage, and handling area 22 receives, stores, handles, conditions, and feeds waste oily sludge, filter sludge, and caustic sludge to the kiln. Area 22 in the preferred embodiment can handle upwards of approximately 2500 tons per year of oily diatomaceous earth, perlite, and filter cloth and 137 tons per year of caustic sludge. Material is received in roll-off ram push-out containers. The ram in the container pushes the sludge into a slow speed shear shredder to shred the filter cloth for feed to the kiln and reduce the size of any stray objects in the sludge.

A sludge pump, in the form of a piston-type concrete pump, feeds the material to the kiln. Waste oily sludge can be pumped from area 21 to the sludge pump for feeding through a kiln lance.

Solids receiving, storage, and handling area 23 receives, stores, size reduces, and feeds all carbonaceous solids, including spent potlining, and other solid carbon wastes, such as anode waste. The sized material is fed to the rotary kiln incineration system. The material handling system in one preferred embodiment can handle approximately 38,000 tons of solids annually. Solid spent potlining is received by rail in 15 yard boxes stacked eight to a rail car. The boxes will be unloaded by means of a fork truck.

Three stage size reduction is provided to achieve a minus ¼-inch product for feed to the kiln.

Container receiving, storage, and handling area 24 is designed to receive, store, handle, de-palletize, stage, and feed 30-gallon and 55-gallon fiber packs. The fiber packs are received on pallets. Flat beds or van-type trailers are employed to transport the palletized fiber packs from the originating plant to this facility. A forklift unloads the pallets at the unloading dock and places the fiber packs in segregated areas of the warehouse according to the compatibility of the material.

Preselected pallets of fiber packs from storage are staged, and a bar code reader will read the identifying code on each fiber pack into the central process control computer for inventory and tracking the feed to the incinerator. At a rate selected by the process computer of as high as 12 containers per hour, the staged fiber packs will be fed to the rotary kiln. The drum staging conveyor will advance, placing a single fiber pack in the drum lift. The drum lift elevates the pack to the feed chute of the rotary kiln and drops the fiber pack through an air lock into the feed chute.

A drum pump is provided as a further addition to allow the flexibility to pump the liquid contents out of a drum to the liquid storage tanks for processing.

Chemical treatment/neutralization area 25 includes a jacketed reaction vessel used for the neutralization of waste acid and for the reduction of chrome sludge liquid wastes. Cooling liquid is circulated through the vessel jacket to remove heat generated during neutralization and reduction. Waste caustic will be used as the primary neutralizing agent with fresh caustic used as required. $SO_2$ is used to reduce chrome from ($Cr^{6+}$) to ($Cr^{3+}$). Neutralized acid is sent to the aqueous storage tanks while reduced chrome sludge is sent to the aqueous feed tank. A packed bed scrubber is used to treat all off-gas from the reaction vessel.

Incineration area 30 is the overall area for waste treatment by incineration. Incineration area 30 is subdivided into sub-areas 31, 32, 33, and 34, each devoted to a particular function or type of incinerator. The sub-areas 31, 32, 33, and 34 include a rotary glassing kiln 31, a kiln transition chamber 32, glass fritting system 33, and a secondary combustion chamber 34.

Slag bath rotary kiln area 31 includes a slag bath rotary kiln 10 and associated equipment. Rotary kiln 10 is a co-current kiln operated in an oxidative, high temperature (1100° to 1300° C.) slagging mode to convert the spent potlining ash, ash from other wastes, and the air pollution control (APC) area 42 baghouse solids to a non-leachable glass. The feeds to the kiln include $SiO_2$ sand and $CaCO_3$, both in amounts and compositions controlled to provide appropriate glass formation as described in detail hereinbelow.

Kiln drive torque capability is sufficient to start the kiln from dead stop, with a full 10% load of "frozen" bath of slag at the 6 o'clock location, then is sufficient further to move the load past the 3 o'clock (or 9 o'clock) position, where the load imparts the greatest resisting torque, up to the 12 o'clock position, to begin continuous rotation following an upset which causes a cold shutdown. While actual operations may at some time allow a load to freeze at 6 o'clock, it is not appropriate to start the kiln rotation under such conditions. When the load advances beyond the 12 o'clock location, it causes an unacceptable overspeed condition. If the load were to rise to the 12 o'clock location intact, it can break loose and fall upon the remaining refractory with destructive result. It is preferable to continue rotation of the kiln, even during times of severe disruption, using an emergency drive. As the kiln is cooled and then heated during emergency upset procedure, the bath will not freeze into a monolith. Frozen bath then will break loose in small chunks by differential expansion stresses during the cooling and heating cycle. During this condition, some solid material will discharge from the kiln into the ash quenching cooler.

The molten glassy residue from the kiln discharges into a water bath where frit is produced. The kiln off-gas discharges into transition chamber 32 (TC) and glass fritting system area to decrease the discharge gas velocity and drop out particulate prior to entering the secondary combustion chamber 34 (SCC).

The ash quencher/cooler 33 accommodates football sized lumps and includes a drag chain having a pull capability sufficient to move and breakup such large size glassy residue material, which is quite friable.

Secondary combustion chamber (SCC) area 34 includes a vertical, up-fired secondary combustion chamber and associated equipment. Combustion gases from the rotary kiln transition chamber pass through the secondary combustion chamber where they are exposed to high temperature, e.g., in the range of about 1200° C. to 1250° C., for a residence time of 2 to 6 seconds. These high temperatures, combined with turbulent flow and oxygen, thermally oxidize kiln combustion gases, as well as additional wastes (waste organic and aqueous liquids) introduced into the secondary combustion chamber, to thermodynamically stable gases. This oxidation completes the incineration process. Flue gases exit the secondary combustion chamber for subsequent downstream gas cleaning unit operation.

The overall area for environmental unit operations is subdivided into sub-areas 42 and 43, each devoted to a particular function. The sub-areas 42 and 43 include air pollution control for the secondary combustion chamber off-gas, glass handling, and waste fixation/stabilization.

Secondary combustion chamber off-gas is treated in air pollution control (APC) area 42 by physical/chemical means to remove particulate matter and acid gases before clean release to the atmosphere.

The secondary combustion chamber off-gas enters the top of a vertical, co-current partial quench chamber where such off-gas is humidified to cool it to approximately 250° C. by spraying with fresh process water and scrubbing liquor purge water. Quench water is primarily fresh water, so particulate generation is minimized. The off-gas is not quenched to adiabatic saturation, to prevent moisture condensation in the two subsequent unit operations.

The 260° C. partial quench off-gas is cooled in a venturi injector using ambient air to a temperature suitable for baghouse operation. The quench air to the venturi section is provided by the quench air blower as necessary to cool the gases to temperatures suitable to protect the bag material (<230° C.), but still above the acid gas dew point (175° C.). The multiple compartment baghouse removes particulate matter, including sub-micron particulates, to achieve a stack emission rate of less than 0.015 grains/dscf. Pulse air bag cleaning is controlled either by differential pressure or timer and is achieved using plant air. Multiple compartments are used to allow on-line inspection and maintenance and to provide flexibility in operating under turndown and maximum flow conditions. Servicing for automatic and manual isolation of compartments is provided. Compartment inlet baffles are included for gas stream diffusion. Low baghouse pressure drop is required for the process (4 to 6 inch $H_2O$ normal, maximum 8-inch $H_2O$).

Baghouse treatment chemicals, primarily hydrated lime, are used to enhance particulate removal and to neutralize acid gas components. The Venturi injector mixes the chemical additive with the gas stream. Particulate matter settling out in the baghouse or pulsed from the bags is collected in the cone shaped bottoms of the baghouse. A portion of this fly ash/lime mixture is recycled for reinjection into the venturi to reduce lime stoichiometric addition requirements. The remaining portion is conveyed to slag bath rotary kiln incinerator area 30 for processing into non-leachable glass.

Flue gas leaving the baghouse enters a scrubber inlet transition quench where the gases are sprayed with fresh process water or recycled scrubbing liquor to humidify and cool the gas to the adiabatic saturation temperature for protection of subsequent downstream equipment.

The transition quench off-gas enters the countercurrent packed bed scrubber where acid gases (HCl, HF) are removed to a minimum 99% efficiency. Twenty percent caustic is used as necessary for neutralization of the recycled scrubbing liquor to a pH range of 7 to 9.

The cleaned discharge gas is pulled through the system and discharged to the stack by an induced draft fan, which controls negative pressure in the slag bath rotary kiln.

Fixation area 43 consists of process equipment used to fix/stabilize waste materials for later disposal in a secure landfill. Waste materials are received in bulk by truck, mixed with a binder and cement, and then allowed to harden into a non-leaching block.

A RCRA standard, secure landfill area 70 including a double liner leachate collection and a system of ground water monitoring wells to control protection against potential release is provided for disposal of non-leachate glass frit, stabilized waste material, and other inorganic solids.

Chemicals and raw materials area 80 provides chemical and raw material storage. Waste and virgin caustic are blended and stored in tanks for use in the chemical treatment/neutralization area and in the environmental control area. Cement and sodium silicate solution are stored in a covered warehouse for use in the fixation/stabilization area. Sand is stored in a silo for use in the incineration area. Caustic is transferred to air pollution control area 42 for use in the wet gas cleaning system, and sand is transferred to the kiln solids feed system.

The logic control basis for operation and control of the industrial waste management facility (IWMF) and the slag bath rotary kiln (SBRK) apparatus and process in application to slagging and disposing spent potlining (SPL) focuses primarily on issues of managing the feed rate mass ratios of the flux materials to achieve goals of high fluidity at moderate molten bath temperatures and high fixation of fluorides in a non-leachable glassy residue.

The logic control basis is aimed at accomplishing three goals in treating and disposing of the spent potlining in the apparatus and process of the present invention:

(1) destroy cyanides,
(2) glassify and fix fluorides, and
(3) combust the carbon graphite.

The destruction of cyanides occurs promptly at the temperatures in the molten bath in the rotary kiln.

Fixation of fluorides requires the addition of silica to form a glass with the fluoride bound in the glass matrix to control leachability. The mass ratio of silica to be added is controlled based on predetermined calculations dependent on the amount of sodium in the spent potlining (SPL). The sodium concentration in the SPL will range over wide limits, depending on its source. The silica mass ratio required will therefore vary ±30% around an average sodium content of about 14%, but this will be a slowly changing value, tending to be fixed for a specific SPL feed from a specific source. Changes will be iteratively accommodated by the apparatus and process of the IWMF as described in detail hereinbelow.

It is important always to have a generous concentration of silica in the bath, since there is a very rapid rate of change in leachability with respect to the silica/sodium ratio.

A major consequence of flux mass ratio is slag bath fluidity. Therefore, it is very important to observe the bath behavior frequently. This observation will require integration of qualitative characterization of bath behavior with the knowledge of changing SPL properties and experience with past successful or less successful flux mass ratios. Changes will be iteratively accommodated by the apparatus and process of the IWMF as described in detail hereinbelow.

The addition of silica to the bath increases the bath viscosity at any temperature. But the viscosity is quite high so that it is difficult to operate the kiln at a temperature as low as at or near the melting temperature of approximately 1150° C. This minimum operating temperature (1150° C.) is desirable to fix a high percentage of the fluorides in the cooled glass rather than volatilizing them in the discharge gases followed by absorption and return to the kiln as $CaF_2$. To demonstrate a suitable bath viscosity with the silica addition to the molten SPL, it was indicated that the addition of calcium carbonate was essential to the substantial reduction of the viscosity, especially for kiln operation at temperatures in the 1150° C. plus or minus 50° C. range.

Small changes in the relative amounts of silica and calcium carbonate have a major effect on the viscosity. Temperature does not have as much effect, but when operating with a defined mixture, the effect of temperature is influential.

The composition of the mixture of materials undergoing incineration and the viscosity-temperature curve for this mixture provide an appropriate temperature control range at which the bath must be maintained to attain adequate fluidity in the molten or slag bath. Further variation in the kiln firing rate controls and adjusts the bath temperature, based on a signal from radiative optical temperature observations.

During normal operation of the slag bath rotary kiln, the energy obtained from oxidizing the carbon in the SPL is sufficient to provide the heat balance to run the process. Under such conditions, the main burner firing rate is cut back to a threshold minimum of about 10% of a maximum fuel rate. The main burner should not be turned off, because it needs to be available promptly, during an upset, to be brought to high fire to keep the molten bath hot and molten.

Air to burn the SPL carbon and the main burner fuel is brought into the kiln through the main burner. The air to burn the carbon must therefore be in the form of burner "XS" air. By "XS" is meant excess air beyond the amount needed to provide the oxygen required for combustion of the fuel and SPL carbon. The kiln main burner is operated through a wide range of firing rages, from 10% of full load, and through a wide range of air-fuel ratios, from 10% to 60% "XS" air.

The SPL carbon is a very inert material, and it is hard to burn. It has been found and it is believed that an important feature of the IWMF of the present invention and a reason for its operability is the use of calcium carbonate as one of the flux materials. Calcium carbonate decomposes promptly at the temperature of the molten bath, giving up carbon dioxide gas. Carbon dioxide gas interacts with the carbon in the molten bath, gasifying the carbon to produce a carbon monoxide/carbon dioxide gas ($CO/CO_2$) mixture. The $CO/CO_2$ mixture then migrates to the surface of the molten bath, where it burns in a "lazy" yellow diffusion flame with the air or oxygen above the molten bath, radiating energy back to the bath surface. Alternatively, calcium hydroxide can be employed as a combined flux material and source of carbon gasification agent. Calcium hydroxide readily gives up water vapor, which will interact with carbon to produce an $H_2O/H_2/CO$ gas mixture.

During normal operation in the rotary kiln, this lazy yellow flame was observed at the surface of the molten bath. During times of upset, when the feed to the rotary kiln was interrupted and bath temperature was maintained by the main burner, the surface of the bath was observed to take on a different appearance. There appeared to form a porous, fluffy partial layer of carbon which floated on the surface of the molten bath. As time during an upset went by, the extent of this porous, fluffy partial layer decreased as it burned away, which identified this material as carbon. It was observed that, during normal operation, the carbon remained somehow slightly bound to the other materials while they are melting, and thus does not appear on the bath surface.

The rate of production of $CO_2$ gas in calcining the calcium carbonate was observed to be sufficient to gasify and remove the carbon before complete melting occurred and the carbon floated to the bath surface. Whatever the actual details or specific mechanism of the carbon combustion mechanism, very high levels of carbon burnout were achieved.

Carbon burnout is important for two reasons. Landfilling of a material which is "ignitable" is generally proscribed under federal EPA and state laws, but it is permissible to landfill a material with some level of carbon. However, in the disposal of spent potlining in a landfill, residual carbon in the glass could contribute to porosity and leachability. Controlling porosity and leachability therefore is the first reason to burn out the carbon.

The second reason carbon burnout is important is because unburned carbon in the molten bath contributes to poor fluidity and difficult-to-manage behavior.

The molten bath, or slag bath, fluid behavior and the fresh feed melting behavior have been observed to provide good fluidity and good temperature control, achieved by effective fluxing, combined with the rotational stirring of the rotary kiln, and excellent homogeneity. The slinger feed method achieved wide spread "distributed" addition of fresh cold feed to the molten bath surface. Specific compositions, controlled to provide predetermined viscosity and excellent homogeneity, and the "distributed" admission of fresh feed to a large surface area of the molten bath permitted the slag bath kiln operation to control problems associated with difficulty in melting the fresh feed or with viscous, unmanageable molten bath behavior.

During times of upset, bath temperature was maintained with the kiln burner. On occasion, the burner must be shut down to clean the off-gas duct. When bath temperatures fall, the bath will begin to behave as a "semi-solid", gooey material, like taffy. Even this condition was not difficult to tolerate. When burner firing was begun again, good bath behavior was regained.

Measurement of the molten slag bath or bed temperature depends on the cumulative effect of the flame impingement point on the surface of the bed, the depth of bed for retained heat, the amount of graphite combustion taking place on top of and in the bed, the amount of lime being disassociated in the bed, the amount of carbon monoxide evolving from the bed and burning at the measurement point, and the reaction of the fluorides with hydrogen in the bed. Since the SPL is being fed by pneumatic slinger injection distributions onto an elliptical surface area, the slag bath in this elliptical area can be varied as the angle and velocity of the slinger injection are adjusted. Since the feed is a blend of crushed SPL, sand, and limestone with different size characteristics, each of these materials will impinge on and settle into the slag bath at different points on the slag surface. Therefore, the effects of each of these materials will result in a slightly different temperature in small increments of the slag bath. Since there is thermal inertia and mixing in the molten slag bath in the rotating kiln, these effects are not large at any one place. Temperature measurements of the slag bath have been found to be consistent using two separate radiative optical measurement devices.

The immediate effect of reducing the carbon concentration in the SPL feed is a requirement for increased fuel consumption to maintain bath temperature and replace the energy supplied by the burning carbon. A large bath mass, and its associated thermal inertia, make the slag bath kiln readily tolerant of even abrupt changes in the amount of fresh feed or variable carbon content in the fresh feed. A gross increase, however, in the carbon content would give rise to such high volumes of gas that the system may reach a bottleneck based on gas volume.

Slag bath kiln operation requires close observation of the bath viscosity, timely information on the feed materials, skilled use of the radiative optical temperature measuring device, and extensive integrating of these several factors into the operating control.

Viscosity characterization of spent potlining, when measured at various temperatures and additions of $SiO_2$ (sand) and $CaCO_3$ (limestone), using a Brookfield Viscometer has been found to decrease with an increase in temperature from 154 poise at 1318° K. to 0.96 poise at 1567° K. The viscosity and the melting point both were found to decrease significantly on additions of limestone and sand to the SPL in various amounts maintaining molar Si/Na and Ca/F$_2$ ratios in the ranges of about 0.8–1.6 and 1.0–1.6, respectively.

It has been found that a composite mixture having a molar Si/Na ratio of about 0.8 and Ca/F$_2$ ratio of 1.0 has the lowest viscosity and the lowest melting point. This lowest viscosity composite has a viscosity of 70.3 poise at 1273° K. and 0.90 poise at 1423° K.

The recycling and safe disposal of SPL by fixing it in a glass matrix require a low viscosity and a low melting point. The viscosity and melting point are controlled by the amounts of additives to the SPL to provide the lowest viscosity values while maintaining its glassy characteristics. The apparatus and process of the present IWMF invention control the viscosity measured as a function of temperature and the amount of additives to the SPL, with the addition of sand and limestone, to provide a high fluidity of SPL melt and molten bath in the rotary kiln.

Spent potlining composite having a molar Si/Na ratio of about 0.8 and a molar Ca/F$_2$ ratio of about 1.0 was found to provide the lowest viscosity at any temperature. This specified composition has the lowest melting point among all the composites based on observations and calculations to find the amounts of additives to the SPL which will reduce the viscosity to the lowest possible level and at the same time maintain its glassy characteristics.

For a Ca/F$_2$ molar ratio of about 1.0, viscosity increases with an increasing Si/Na molar ratio, and this is attributed to the decreasing basicity of the melt with increasing Si/Na molar ratio. For higher Ca/F$_2$ molar ratios, e.g., such as about 1.2, the viscosity first decreases with increasing Si/Na molar ratio and then increases, i.e., exhibits a minima, because an optimum basicity index is required for having minimum viscosity. Basicity index of a melt is given by the following expression:

$$\text{Basicity index } B = \frac{(\Sigma \text{ wt. \% basic oxides})}{(\Sigma \text{ wt. \% acidic oxides})}$$

Since silica is strongly acidic in nature, the basicity index of the melt decreases with increasing Si/Na ratio and reaches an optimum value where it gives the lower viscosity, beyond which the viscosity again increases. At still higher Ca/F$_2$ ratios, e.g., such as about 1.6, the plot of viscosity against Si/Na ratio exhibits a maxima, i.e., the viscosity first increases with increasing Si/Na ratio and then decreases, because the basicity index has an optimum value corresponding to a low Si/Na ratio of about 1.2. On increasing the Si/Na ratio to about 1.4, the basicity index decreases from the optimum value, and the viscosity increases. On further increasing the Si/Na ratio to 1.6, the role of $Al_2O_3$ becomes important.

$Al_2O_3$ is present in the SPL in significant amounts (7.2%). It has an amphoteric nature, i.e., it can act as a basic or acidic oxide depending on other constituents of the melts. Therefore, at high Si/Na molar ratios, $Al_2O_3$ acts as a basic oxide rather than an acidic oxide, which results in a decrease in the basicity index of the melt. Low viscosity of composites having Ca/F$_2$ ratios of about 1.6 and Si/Na ratio of about 1.6 are attributed to the same amphoteric nature.

Leachability of fluorides plotted as a function of atomic Si/Na ratios were observed to show lower amounts of leachable fluorides in the SPL product obtained by Si/Na ratios greater than about 1.3. The effect of other additives such as $CaCO_3$ on the leachability of fluorides in the melt may be additive. Variation in the Ca/F$_2$ ratio will also affect the leachability of fluorides in SPL.

The IWMF system includes providing apparatus and process for blending feed materials to achieve the appropriate molar ratios as described in detail hereinabove. A solids feed system receives, mixes, and feeds spent potlining solids, sand, calcium carbonate, and recycled baghouse discharge dust to the rotary kiln. One or more pneumatic slingers feed such mixed solids to the kiln. Additionally, an optional conveying/feed chute system provides a feed stream for containerized aqueous and organic liquids and sludges. Two separate liquid streams feed bulk aqueous and organic liquids to the kiln. An additional lance is employed for feeding bulk filter/oily sludge to the kiln.

The solids feed system receives, mixes, and feeds to the rotary kiln the crushed and sized to minus ¼-inch spent potlining solids, sand, calcium carbonate ($CaCO_3$) solids, and recycle baghouse dust consisting of $CaF_2$ and $Ca(OH)_2$. All solids will be delivered via four separate enclosed screw conveyors. Spent potlining solids are delivered from Area 23, sand and calcium carbonate from Area 80, and baghouse dust from Area 42.

The feed system mixes the SPL solids, sand, $CaCO_3$, and baghouse dust in the proper proportions for treatment in the kiln. All equipment is enclosed and structured to control fugitive dust emissions to the atmosphere.

The feed mixing system has the capability to react and change to variable or inconsistent SPL solids compositions and to make quick response changes in the mix fed to the kiln according to predetermined specified kiln slag viscosity and glass product characteristics. Quick response is defined in terms of minutes rather than in terms of a day or more.

The feed employs one or more pneumatic slingers to inject and feed the mixed solids to the kiln. The pneumatic slinger injection maximizes the time available for carbon burnout and solid phase glassification reactions to occur and minimizes entrainment of unreacted solids in the gas leaving the kiln.

The IWMF also includes the optional capability for the rotary kiln to accept both 30-gallon and 55-gallon size steel, fiber, or plastic containers containing solids, sludge, and organic or aqueous liquids according to a prescribed IWMF waste profile.

The optional container feed system includes a staging conveyor, a container elevator or drum lift to deliver the containers to the kiln feed elevation, an air lock and a feed chute through which whole containers enter the kiln, and a feed chute relief vent to prevent over-pressurization in the feed chute and feed end of the kiln.

The slag bath rotary kiln is operated co-currently and oxidatively. The kiln has a main burner located in the inlet or feed end, fired with natural gas. Air is supplied through the burner to the kiln for the burner and for the kiln chamber. Leak air, i.e., air leaking into the rotary kiln through openings other than the burner nozzle should be minimized.

The kiln operates at elevated temperatures above about 1100° C., preferably at 1150° C. to 1300° C. The kiln converts the noncombustible portions of the waste feed materials into a non-leachable glass and vaporizes the waste feed organics to form a kiln off-gas. Molten glass produced in the kiln discharges into a water bath where frit is produced suitable to be landfilled. The kiln off-gas discharges into the transition chamber to decrease velocity and drop out particulates prior to entering the secondary combustion chamber (SCC). Steam generated from the water bath becomes a part of the kiln off-gas stream in the transition chamber (TC).

The SCC is located above the transition chamber and provides a vertical upfired unit such that residual slag can drip into the frit bath. The SCC will actually be located to fit in the transition chamber. The transition chamber will be fired at the minimum rate during normal conditions, when the kiln off-gas is at its normal temperature of 1300° C. The burner must be ready to be promptly fired at a higher rate needed to maintain the refractory hot faces on the kiln dam and the TC well above the slag fluid temperature. The SCC provides an elevated temperature, e.g., at 1200° C., and sufficient oxygen and residence time, to complete the oxidation of any carbonaceous and organic constituents of the off-gas from the rotary kiln. The SCC burner is fired with natural gas. Air is supplied to the burner and to the SCC chamber. The minimum required residence time for the SCC is 2 seconds at a temperature of about 1200° C.–1250° C. The SCC will also have the capability to directly treat the optional bulk aqueous and bulk organic liquid waste streams. The SCC off-gas is exhausted to the air pollution control (APC) system.

The slag bath rotary glassing kiln of the present invention includes a rotating refractory-lined cylindrical device operated co-currently (gas and solids flowing in the same longitudinal direction) and in the oxidative mode (excess air with respect to all combustible materials in the kiln) with a bath of molten slag throughout its entire length. The kiln converts the noncombustible portions of the waste feed materials, including SPL solids, into a non-leachable glass and vaporizes and combusts the waste feed organics, including the cyanide content and a large portion of the elemental carbon content in the SPL solids, for subsequent complete destruction in the secondary combustion chamber.

All kiln refractory firebrick can sustain a maximum hot-side temperature of 1600° C. and incorporate a high alumina content to withstand the corrosion effects of the molten slag bath. The firing and exhaust gas seals and housing are structured to minimize air leakage to less than 1% of maximum controllable air. The rotary kiln has a specified minimum length to diameter (L/D) ratio of 4 to 1. The maximum combustion gas velocity in the kiln is controlled and limited to 15 feet per second to minimize particulate carryover in the kiln off-gas. The discharge-end seal cooling system avoids cooling the molten slag discharging from the kiln to the point where the slag is prevented from freely flowing into the water bath glass fritting system.

The kiln main burner, located in the feed end, is fired with natural gas. The burner provides the driving force for carbon burnout and molten slag bath maintenance in the kiln and makes up any auxiliary energy requirements associated with kiln operation at temperatures in the range of 1200°–1400° C. Burners or natural gas lances will be located at the discharge end of the kiln or in the transition chamber for impinging a flame on the slag exiting the kiln to keep the slag molten and freely flowing and to prevent excessive buildup on the discharge end dam.

The separate liquid lances, located in the front face of the rotary kiln, provide means to feed bulk organic liquid waste and bulk aqueous liquid waste to the kiln. Each lance provides for external atomization with steam or air and for cleanout and deplugging with steam. Bulk aqueous liquids are delivered to the aqueous lance through a centrifugal pump. Bulk organic liquids are delivered to the organic liquid lance through a gear pump. Combustion air for the organic liquid lance is provided in the vicinity of the lance. An alternative to providing the organic liquid lance is a single sludge lance, located in the front face of the rotary kiln. The single sludge lance feeds oily and filter sludge to the kiln. The sludge lance provides for external atomization with steam or air and for cleanout and deplugging with steam. Bulk filter sludge is shredded and combined with oily sludge and delivered to the sludge lance through a positive displacement concrete type pump.

The secondary combustion chamber (SCC) includes a vertical upfired refractory-lined chamber located adjacent the transition chamber downstream form the rotary kiln. The secondary combustion chamber provides an elevated temperature, and sufficient oxygen and residence time, to complete the oxidation of any carbonaceous and organic constituents of the discharge gas from the rotary kiln. The SCC gas residence time is specified at 2 seconds at about 1250° C. at maximum flow conditions. The SCC treats the optional waste organic liquid and waste aqueous liquid.

Slag forms on the walls of the SCC during operation. The configuration and burner placement are structured to provide that slag runs down the walls of the SCC through the transition chamber and drips into the water quench section of the glass fritter. The water quench where glass frit is formed is positioned such that it is not directly in the path of stalactites that could form on the roof of the SCC, break off, and fall directly into the water bath.

The SCC refractory firebrick is designed to the same requirements as the rotary kiln service refractory.

A refractory lined emergency relief stack on top of the SCC is sized to release the combined combustion gas from the kiln and the SCC.

The SCC can have one main burner located so that the combustion gas residence time in the SCC downstream of the burner is, by way of example, about 2 seconds and such that the slag running down the walls of the SCC will not interfere with burner operation. The SCC burner is fired with natural gas. The purpose of this burner is to provide the auxiliary energy requirements associated with SCC operation at 1150°–1250° C.

An aqueous liquid lance located in the SCC provides the optional capability of feeding bulk aqueous liquid waste to the SCC. The lance is located between the SCC burner and the transition chamber so that the waste is injected prior to the 2 second residence time initiation and so that spray in the path of the burner flame does not quench and does not impinge on the refractory wall. The lance provides for external atomization with steam or air and for cleanout and deplugging with steam. Bulk aqueous liquids are delivered to the SCC lance from Area 21 through a centrifugal pump.

The horizontal refractory lined transition chamber, located between the kiln and SCC and on top of the water quench section of the glass fritting system, reduces the velocity of the kiln off-gas to drop out entrained particles so that particulate carryover into the SCC and subsequent air pollution control equipment is minimized. The velocity of the gas at the exit of the transition chamber is about 50% of the kiln exit gas velocity.

The configuration of the transition chamber is structured to control excessive slag solidification and buildup on the outside of the kiln end dam, from cooling associated with the steam generation from the glass fritting water bath, which otherwise can cause the refractory to break away. The kiln discharge burners located in the transition chamber also provide control to maintain slag fluidity.

Molten slag from the rotary kiln drops into a water quench chamber which quickly cools the slag and turns it into fritted glass. The chamber water is agitated and maintained at a temperature greater than 65° C. during operation. A drag chain conveyor or similar device located at the bottom of the chamber moves the glass frit out of the quench and into a container for subsequent transportation to the landfill. The drag chain conveyor system allows for water to drain from the frit prior to transportation. Drained water is returned to the quench chamber.

The IWMF air pollution control (APC) system provides a zero-discharge dry gas cleaning system containing a partial wet quench to cool the SCC off-gas, a baghouse to remove 99.9% of the particulate and 80% to 90% of the HF from the cooled SCC off-gas, a limestone injection system to inject very fine (10–40 micron) $CaCO_3$ and recycle baghouse dust containing $CaCO_3$ to the baghouse, and a wet scrubber with pH control by NaOH to remove the remainder of the HF and other acid gases from the baghouse off-gas such that only equilibrium concentrations exist in the stack gas.

The APC system is characterized as zero discharge since the baghouse dust can be recycled to the rotary kiln and the relatively small aqueous purge from the scrubber can be recycled to the partial quench. Limestone ($CaCO_3$) is preferred for the baghouse over hydrated lime, $Ca(OH)_2$. Although not as reactive, limestone is less expensive and more useful when recycled to the kiln as part of the baghouse dust. The limestone is controlled to have a particle size of approximately 10–40 microns and a stoichiometric ratio of 3.0 to obtain 90% removal of HF in the baghouse.

The transition chamber/ash quencher cooler functions as a "drop-out box" to de-entrain particulate in the rotary kiln off-gas. De-entrained particulate will impact on the rear wall of the chamber and stick to the refractory, become molten, and flow down the walls into the ash quencher cooler water bath below. This device also receives slag which discharges over the kiln end dam into the ash quencher cooler water bath. In addition to these flows, the water bath also receives any slag or particulate that may fall from the secondary combustion chamber which has its base submerged in the water. Slag which falls into the water tends to fracture into ⅛" glass frit although larger particle sizes may be encountered, particularly during upset conditions. Accumulated frit is removed via glass frit conveyor. The water bath is continuously agitated by an array of water jets powered by a recycle pump. A heat exchanger may also be added to this recycle loop as required.

The transition chamber/ash quencher cooler is equipped with the natural gas fired transition chamber burner system which gets combustion air from a transition chamber fan.

Secondary combustion off-gas is treated by physical/chemical means to remove particulate matter and acid gases before release to the atmosphere.

The secondary combustion chamber off-gas enters the top of a vertical, co-current partial quench chamber where the gas is humidified to cool it to approximately 260° C. by spraying with fresh process water and scrubbing liquor purge water. Quench water is primarily fresh water, so particulate generation is minimized. Any liquid purge from the partial quench is returned to Area 23 for treatment/reuse. The off-gas is not quenched to adiabatic saturation, to prevent moisture condensation in the two subsequent unit operation.

The 500° F. partial quench off-gas is cooled in a venturi injector using ambient air to a temperature suitable for baghouse operation. The quench air to the venturi section is provided by a quench air blower as necessary to cool the gases to temperatures suitable to protect the bag material (<230° C.), but still above the acid gas dew point (175° C.). The multiple compartment baghouse removes particulate matter, including submicron particulates, to achieve a stack emission rate of less than 0.04 gains/dscf. Pulse air bag cleaning is controlled either by differential pressure or timer and is achieved using plant air. Multiple compartments are used to allow on-line inspection and maintenance and to provide flexibility in operating under turndown and maximum flow conditions. Automatic and manual isolation of compartments provide for full service at maximum loadings with one compartment isolated out of service. Compartment inlet baffles are included for gas stream diffusion. Low baghouse pressure drop is required for the process (4 to 6 inch $H_2O$).

Fresh $CaCO_3$ is unloaded from trucks to the $CaCO_3$ storage silo. Displacement gas particulate from this transfer is controlled by the silo fabric filter. The baghouse treatment chemicals are transferred from the silo to the venturi injector by the $CaCO_3$ conveyor. The venturi injector mixes the $CaCO_3$ with the gas stream to enhance particulate removal and neutralize acid gas components.

Particulate matter settling out in the baghouse or pulsed from the bags is collected in the cone-shaped bottoms of the baghouse and discharges through the baghouse solids discharge valves to the baghouse solids discharge conveyor. A portion of the baghouse fly/limestone mixture is discharged from this conveyor into a solids recirculation conveyor. The remaining portion of solids is transferred to the kiln solids feed system by a baghouse blowdown conveyor.

The solids recirculation conveyor transfers material to a baghouse recycle surge bin. Displacement gas particulate from this transfer is controlled by the surge bin fabric filter. The recirculated solids are transferred from the surge bin to the venturi injector by the baghouse recycle conveyor. Recirculation of treatment chemicals improves removal effectiveness at a lower stoichiometric ratio.

Flue gas leaving the baghouse enters the scrubber inlet transition quench where the gases are sprayed with fresh process water or recycled scrubbing liquor to humidify and cool the gas to the adiabatic saturation temperature for protection of subsequent downstream FRP equipment.

Transition quench off-gas enters the counter-current packed bed scrubber where acid gases (HCl, HF) are removed to a minimum of 99% efficiency. Scrubbing liquor collected in the sump is strained by the scrubber recirculation strainer and then pumped by two identical scrubber recirculation pumps back to the spray headers in the top of the scrubber and the inlet transition quench. Provisions are included for addition of fresh water necessary to the scrubber and quench sprays. Twenty percent caustic is used as necessary for neutralization of the recycled scrubbing liquor to a pH range of 7 to 9. Caustic and scrubbing liquor mixing is accomplished in a static mixer.

Scrubbing solution droplets contained in the gas downstream of the packed bed are removed in an entrainment separator located in the packed column above the bed. The entrainment separator is irrigated with fresh water or recycled scrubbing liquor. Low pressure drop across the packed scrubber system is a process requirement (normal 4 inch $H_2O$, maximum 5 inch $H_2O$). The scrubbing system and controls are designed to handle the maximum flows/loadings and required turndown without flooding and channeling.

The gas is pulled through the system by an induced draft fan, which controls negative pressure in the ashing and glassing kilns. Fresh process water is used for fan seal flush and blade spray to remove impinged particulate matter.

The gases leaving the induced draft fan are discharged through the stack to the atmosphere. The stack is equipped with a drain for potential condensate collection. The stack also has provisions for manual stack sampling necessary to demonstrate compliance with applicable regulatory requirements.

Alternately, crushed limestone ($CaCO_3$) or hydrated lime ($Ca(OH)_2$) can be used for acid gas absorption in the baghouse.

Hydrogen fluoride (HF) absorption at levels higher than 90% using lime is achievable at stoichiometric ratios of lime to HF as low as 1.5. This technology is well known particularly with regard to removal of hydrogen chloride (HCl) gas which is more difficult to remove than HF.

The concept of using limestone to remove HF is not well known. It is believed that this is possible, but at much higher stoichiometric ratios. Removal of HF at the 90% levels is achieved using a stoichiometric ration of 4.0, but that the overall requirement for fresh limestone is reduced by recycling some of the baghouse solids, assuming the use of a 10 micron average particle size limestone.

The current estimate of cost of these materials in 1993 dollars are as follows.

| Material | Size Particle | Cost |
| --- | --- | --- |
| Hydrated lime | >95% passing 325 mesh | $55/ton |
| Pulverized limestone | >65% passing 325 mesh | $15/ton |
| Classified limestone | 10 micron avg. | $25/ton |

Hydrated lime has a large surface area to volume ratio compared to limestone. Smaller particle size translates into a lower stoichiometric requirement but at an increased cost.

While the use of the more expensive lime in the baghouse is somewhat offset by the use of pulverized limestone (cheaper than classified limestone) in the kiln, since limestone is required in the kiln, it should also be used in the baghouse since the baghouse purge stream could serve as the limestone source.

Air pollution control (APC) treats the off gases from the incineration process by physical/chemical unit operations to remove pollutants before discharge to the atmosphere. The unit processes include gas cooling, particulate filtration, humidification, acid gas neutralization, and absorption. APC controls and maintains proper temperatures, flow rates, and pressures to provide effective cleaning of the flue gases.

A partial quench cools the SCC off-gas to reduce volume and temperature design requirements for downstream equipment. The primary control variable is outlet temperature. A temperature controller is provided for quench water flow set-point input.

At the exit of the partial quench, continuous, on-line measurement is made for oxygen, carbon monoxide, and an indicator of combustion gas velocity. Each of these parameters is monitored and recorded.

For regulatory purposes, the carbon monoxide, flow rate, and oxygen instrument outputs are connected to a master interlock system to stop the waste feeds if the permitted values for the parameters are exceeded. The carbon monoxide and oxygen monitoring system allow the incinerator to operate without a regulatory shutdown in the event of a short duration spike by use of time weighted rolling averages.

Combustion gas flow rate is monitored as an indicator of combustion gas velocity. The combustion gas flow rate monitoring system allows the incinerator to operate without a regulatory shutdown in the event of a short duration spike by the use of the weighted rolling average.

The air quench is designed to protect the baghouse equipment from high temperature shocks. The baghouse inlet temperature is monitored continuously and controls the quench air blower output to the low pressure drop venturi injector. A high-high baghouse inlet temperature alarm activates the master interlock system to initiate emergency shutdown.

Dry chemical addition control to the venturi injector involves manual set point for continuous constant volume feed of dry additive and recycle.

The baghouse off-gas is monitored and recorded continuously for excessive particulate matter content using an opacity monitor. High opacity is an indicator of broken bags or other malfunction. High opacity is interlocked to initiate sequenced isolation of baghouse compartments to identify a leak while the system continues to operate. If high opacity continues after isolation sequencing, an/upset condition is indicated and the master interlock system is initiated.

The primary control variable for the packed bed scrubber is recycle flow. A flow controller with continuous recording is provided to ensure effective absorption of acid gases. The controller ensures that recycle flow is maintained. A loss of recycle flow activates the master interlock system to initiate emergency shutdown.

Scrubbing liquor pH is monitored continuously in a pH recycle loop and controls caustic addition (flow) to the static mixer located in the recycle line. Low-low pH activates the master interlock system to initiate emergency shutdown.

The induced draft fan is the prime gas mover for the incineration processes. Fan performance is critical to the performance and safe operation of the process. Negative pressure at the slag bath rotary kiln firing end is maintained. Fan stoppage is indicated by low-low outlet pressure and activates the master interlock system. Activation of the master interlock system resulting from other process upset conditions will result in fan shutdown.

The induced draft fan receives a water saturated flue gas from the wet gas cleaning system with small amounts of entrained droplets containing dissolved and suspended solids and acid gases. The induced draft fan generates enough suction head to maintain the upstream equipment under negative pressure. The slag bath rotary kiln must be maintained at a minimum of −0.5 in. w.c. This negative pressure must be maintained at maximum operating conditions and maximum turndown.

The present inventions have been tested experimentally for treating spent potlining in a rotary kiln. In this actual experimental application, the inventions have been observed to operate as a continuous slagging, single-zone heating kiln for feed materials of spent potlining, sand, and limestone consistent with predetermined silicon/sodium ratios and molten bath temperatures required to adequately fix the fluoride to the spent potlining by glassification.

ACTUAL EXAMPLE OF THE PREFERRED EMBODIMENT

Large rotary kiln tests were conducted on spent potlining (SPL) and various additives.

EXAMPLE I

The main objective of this Example I was to focus on the technical feasibility of burning spent potlining and other wastes while producing solids containing non-leachable fluorides.

All four performed tests served as "screening" tests with several basic interests for observation:

Slagging temperatures
Bed homogeneity
Feasibility of dumping wastes into bed
Locking fluorides into non-leachable glassy form
Low carbon content
Control of melt (low viscosity)
Gas emission rates
Materials All the materials were furnished by the Aluminum Company of America (Alcoa) of Pittsburgh, Pa. and consisted of:

673 lbs of spent potlining (SPL)
609 lbs of spent potlining ashes
564 lbs of sand
22 lbs of oily filter media
20 lbs of mode assembly
The composition of SPL is shown in Table 4.

TABLE 4

| FEED SPENT POTLINING RANGE OF CONSTITUENTS | |
|---|---|
| % Fluoride | 14 ± 3 |
| % Carbon | 40 ± 20 |
| % Na | 13 ± 3 |
| % Al | 11 ± 3 |
| % Ca | 2 ± 1 |
| % Fe | 1 ± 0.5 |
| % CN⁻ | 0.004 − 0.2 |
| % Oxides | 10 ± 5 |
| Heating Value, Btu/lb | + 5000<br>4000 − 2000 |

A 24-inch diameter by 42-inch long refractory lined batch rotary kiln was fitted with an off-gas chamber box, which served the purpose of positively capturing kiln off-gas. A duct system connected the rotary kiln with an afterburner, quench tower, baghouse, inductive draft (ID) fan, and a stack.

The temperature within the rotary kiln was measured by radiative optical pyrometer through the sampling door in the off-gas chamber.

The rotary kiln was operated at 6 rpm with firing gas flow rate of 130 SCFM with 10% excess oxygen.

Difficulties were encountered with molten bath climbing up into exhaust box, so the front end of the rotary kiln was raised one inch after Test No. 1.

Slag sampling was executed through an off-gas chamber inspection door, utilizing a specially manufactured large stainless steel scoop. Samples of the molten bath were quenched by cooling the sample in the scoop in cold water bath.

A total of four (4) fundamental large batch rotary kiln tests were conducted in four testing days. For each test, the kiln refractory was preheated to:

| Test No. 1 | 1150° C. |
|---|---|
| Tests No. 2, 3 & 4 | 1360° C. |

The initial kiln charge was calculated to be 10% kiln loading, and the various sand to SPL ratios were as follows:

| Test No. 1 | 52.3# SPL Ash + 52.3# Sand |
|---|---|
| Test No. 2 | 132# SPL Ash + 40# Sand |
| Test No. 3 | 100# SPL + 61# Sand |
| Test No. 4 | 100# SPL + 53# Sand |

During each test/subtest (as in Tests No. 3 & 4), the temperatures of the molten bath, bed position, bed depth, viscosity estimates, time required to heat, and the time required to melt and absorb into the bath the fresh bed charges were observed and recorded.

Samples of molten bath were collected at certain time intervals or following changed test conditions. Some of the samples were submitted for residual carbon analysis. Some of the samples were analyzed for fluoride leachability.

Table 5 shows data for all submitted samples on residual % C as reported by the testing lab.

TABLE 5

| Test No. | Residual % C |
|---|---|
| 1 | #1 = 0.14% |
|  | #2 = 0.39% |
|  | #3 = 0.11% |
|  | #4 = 0.09% |
|  | #5 = 1.19% |
| 2 | #5 = 2.55% |
|  | #7 = 0.80% |
|  | #9 = 0.55% |
|  | #12 = 0.05% |
| 3 | #2 = 0.76% |
|  | #4 = 0.55% |
|  | #7 = 0.45% |
|  | #10 = 0.70% |
|  | #11 = 0.36% |
| 4 | #1 = 0.19% |
|  | #5 = 0.34% |
|  | #8 = 0.27% |
|  | #11 = 0.19% |
|  | #14 = 0.25% |
|  | #15 = 0.25% |

The test showed that despite the dense structure of spent potlining, the graphite can well be burned in a molten slagging bed mode.

The molten bath exhibited good behavior. Backcharged materials were easily blended in and were melted within several minutes.

Viscosity of the melt seemed to be subject to two factors. Higher temperatures produced lower apparent viscosities, and the addition of Ca containing additives reduced the viscosity considerably.

EXAMPLE II

As in Example I, the purpose was to burn the carbon to minimum residual amounts and to lock the fluorides into a non-leachable form. The blended ratio of SPL, sand, and limestone was varied to search for a controllably low viscosity melt at lower temperatures.

The materials used were: fine spent potlining; minus 10 mesh material, sand, limestone (Hurlibut limestone, minus 200 mesh, 99% pure) and coarse spent potlining.

The 24-inch diameter by 42 inch long refractory lined batch rotary kiln was positioned as in the previous four tests of Example I at a negative slope. The discharge end was set 1 inch above the horizontal level. The burner end was the low point.

The rotary kiln was fitted with an off-gas chamber box, which served the purpose of positively capturing kiln off-gas. A duct system connected the rotary kiln with the afterburner, quench tower, baghouse, inductive draft (ID) fan and a stack.

The temperature within the kiln was measured by radiative optical pyrometer through the sampling door in the off-gas chamber.

The rotary kiln was operated at 7 rpm with firing gas flow rate of 130 SCFM with 10% excess oxygen.

Molten slag sampling was executed through the off-gas chamber inspection door, utilizing a specifically manufactured large stainless steel scoop. Samples of the molten material were quenched in a water bath.

Prior to charging the kiln with the blend, the kiln refractory was preheated to 1150° C.

The composition of the initial mix was as follows:

| |
|---|
| 100 lbs of fine spent potlining |
| 39 lbs of sand |
| 78 lbs of limestone |
| 217 lbs Total |

The composition of the backcharges were as follows:

| |
|---|
| 10 lbs of fine spent potlining |
| 4 lbs of sand |
| 8 lbs of limestone |
| 22 lbs Total |

During the test, temperatures of the molten bath, the bed position, bed depth, viscosity estimates, time required for heat, and time required to melt the fresh backcharges were observed and recorded.

Samples of molten bath were collected at 5, 10, and 15 minutes following the last charging, and at longer time intervals after charging with coarse SPL blends.

The molten bath exhibited good behavior. The backcharged blends containing fine SPL were easily blended in, and materials melted within several minutes, creating smooth, low viscosity melts.

While charging fresh materials, there was noticeably fewer fuming, wild flames and sparks than in the first part of this Example II.

At the target temperature of 1150° C., the melt was observed to be "liquid"-like, very smooth. It was observed that ½"∅ ceramic balls placed on the melt surface immediately dropped to the bottom. While collecting samples, it was possible to pour out the melt into quenching water which was impossible to do during previous tests.

There was a noticeable color to some last samples which was changing from gray, gray-green to light green, according to the temperature and elapsed time.

EXAMPLE III

The specific objectives of Example III were to determine:

preferred additive mass ratios of

| | |
|---|---|
| Si/Na = 1.4 plus | (3.66 lbs SiO$_2$/lb Na) |
| CaO/SiO = 1.2 plus | (1.12 lbs CaO/lb SiO$_2$); | the working temperature range for the condition of manageable melt viscosity;

the effect of fluoride off-gas during carbon burnout using CaO versus CaCO$_3$; and recycle of CaF$_2$ from the baghouse to the bath to be simulated to determine fluoride evolutions.

The materials used were:

fine spent potlining;

sand;

15 limestone (Hurlbut minus 200 mesh limestone);

pebble lime (supplied from Western Lime & Cement Company); and fluorspar.

Since the "as received" SPL was coarse, minus 1 inch in size, it was necessary to crush SPL to resemble the size distribution of SPL as used in previous tests. Cone and smooth roll crushers were utilized to do the size reduction.

The "as received" lime was in a pebble form which was not acceptable for good mixing with fine materials. Lime was quickly crushed to minus ⅛" and sealed in a plastic bag.

The large refractory lined batch rotary kiln was positioned as in Examples I and II at a negative slope. While preparing the set-up, it was discovered that the original 24-inch rotary kiln inside diameter was enlarged to 29 inches after running Examples I and II. The refractory was Kast-O-Lite 30.

The rotary kiln was fitted with an off-gas chamber box, which served the purpose of positively capturing kiln off-gas. The duct system connected the kiln with the afterburner, quench tower, baghouse, inductive draft (ID) fan and a stack.

The temperature within the rotary kiln was measured by radiative optical pyrometer through the sampling door in the off-gas chamber.

The rotary kiln was operated at 7 rpm with a firing gas flow rate of 130 SCFM with 10% excess oxygen.

Slag sampling was executed through the off-gas chamber inspection door, utilizing a specially manufactured large stainless steel scoop. Samples of the molten material were quenched in a water bath.

The initial mix composition was blended as follows:

|  | Test No.1 | | Test No. 2 | |
| --- | --- | --- | --- | --- |
| Fine spent potlining | 45.5% | 58.7# | 37.17% | 90.7# |
| Sand | 24.5% | 31.6# | 20.07% | 49.0# |
| CaO | 30.0% | 38.7# | — | — |
| CaCO₃ | — | — | 42.76% | 104.3# |
| TOTAL | 100.0% | 129.0# | 100.0% | 244.0# |
| | | 10% Kiln Volume | | 17% Kiln Volume |

Prior to charging the initial charges, the kiln refractory was preheated to about 1150° C.

During the tests, the temperatures of the bath (read by an optical pyrometer), bed position, viscosity estimates, and time required for meltdown were observed and recorded.

Based on Test No. 1, lime (CaO) was not reacting at all with SPL and sand at the tested temperature of 1200° C. Fluorspar ($CaF_2$) addition did not lower viscosity. At around 1195° C., the melt was of manageable viscosity but contained unreacted CaO grit. At 1160° C., the viscosity of the bath was extremely high, with all material deposited on kiln walls.

Based on Test No. 2, as soon as the carbon burnout was completed, the temperature dropped, and the melt viscosity rapidly changed. At 1200° C., the melt was stuck to the walls. At 1230° C., the viscosity improved. At 1270° C., a well behaving, low viscosity melt was observed. $CaF_2$ additions did lower the viscosity of the melt, equivalent to about 80° C. difference. At 1170° C., the melt containing enough $CaF_2$ was appearing pasty, but well manageable, easily mixed with fresh feed stock.

EXAMPLE IV

Large rotary kiln tests were performed on a blend of three basic materials to simulate variable alumina content in the spent potlining.

The actual rotary kiln tests determined the fluidity of the melt at three different alumina levels, at given ranges of temperatures. The desired ranges of temperatures were at a minimum 1050° C. and a maximum 1250° C.

Spent potlining, as used in all tests, was substituted by a synthetic blend, consisting of sodium silicate and calcined alumina, including sodium silicate, $2 SiO_2.Na_2O$ received from PQ Corp., Anderson, Ind.; calcined alumina, $Al_2O_3$, supplied by Allis Mineral Systems, T/C, type A12; and iron oxide, $Fe_2O_3$, supplied by Allis Mineral Systems, T/C. Iron ore pellets were crushed to –¼" (Test #1) ground to –28 mesh for Test #2 and #3.

To reduce the melt viscosity, additives were used, including fluorspar, $CaF_2$, received from Alcoa, Tex. and Hall Cell Bath, $3NaAlF_6$, received from Alcoa, Pa.

The rotary kiln was fitted with an off-gas chamber box, which served the purpose of positive capturing kiln off-gases. The duct system connected the rotary kiln with the afterburner, scrubber, inductive draft (ID) fan, and a stack.

The temperature of the melt was measured by a radiative optical pyrometer, through the sampling door in the off-gas chamber.

The rotary kiln was operated at 4 rpm with firing gas flow rate of 150 SCFM, with 5% excess oxygen.

Slag sampling was done through the off-gas chamber inspection door, utilizing a specially manufactured small stainless steel scoop. Samples of the molten material were quenched in a water bath.

After each test, the rotary kiln was cleaned as much as possible by removing the melt with a special large stainless steel scoop.

Prior to charging the materials, the kiln refractory was preheated to 1066° C.

During the tests, the temperature of the melt (read by the radiative optical pyrometer), the bed position, the viscosity, and the observations of events were recorded.

A summary of all the test compositions, with the viscosity lowering additives, charged as a "backcharges" during the run, is shown in Table 6.

TABLE 6

| SUMMARY OF FEED BLENDS | | | | | | |
| --- | --- | --- | --- | --- | --- | --- |
| | TEST NO. 1 Weight | | TEST NO. 2 Weight | | TEST NO. 3 Weight | |
| | lbs | kg | lbs | kg | lbs | kg |
| MATERIALS | | | | | | |
| $2SiO_2.Na_2O$ | 153.1 | 69.43 | 130.2 | 59.05 | 190.0 | 86.17 |
| $Al_2O_3$ | 35.4 | 16.05 | 60.1 | 27.26 | 60.1 | 27.26 |
| $Fe_2O_3$ | 11.5 | 5.22 | 9.7 | 4.40 | 12.1 | 5.49 |
| TOTAL ADDITIVES | 200.0 | 90.70 | 200.0 | 90.70 | 262.2 | 118.91 |
| $3NaAlF_6$ | 4.0 | 1.81 | 4.1 | 1.86 | 5.0 | 2.27 |
| $CaF_6$ | 4.1 | 1.86 | 4.0 | 1.81 | 5.0 | 2.27 |
| ADDITIONAL ADDITIVES | | | | | | |
| $3NaAlF_6$ | | | | | 10.0 | 4.54 |
| $2SiO_2.Na_2O$ | | | 50.0 | 22.68 | | |

$Fe_2O_3$ for Test No. 1 was crushed to –¼"
$Fe_2O_3$ was crushed and ground to –28 mesh for Test No. 2 and No. 3.

The Test No. 1 blend had 7.1% calculated alumina content.

During the test melt, the viscosity was kept under control by addition of backcharges. While removing the produced melt from the kiln, no additional cryolite or fluorspar were added to keep the melt "fluid." It was not possible to remove all the melt from the kiln. Thus only 143 lbs of Test No. 1 charge were recovered as a product.

The Test No. 2 blend had a calculated 14.2% alumina content. This blend turned out to be very difficult. The high viscosity melt was climbing over the burner, closing the burner open area at frequent occasions. An addition of cryolite lowered the viscosity somewhat, but not enough to obtain a manageable melt. After 67 minutes into the heat, where only 115.5 lbs of prepared charge were used, the test was interrupted and stopped.

The Test No. 3 blend was designed to have an alumina content of about 10%, an amount between the content of Test No. 1 and Test No. 2.

This Test No. 3 blend was less difficult than the Test No. 2 blend, but the melt was of high viscosity, coating the kiln walls in a uniform, smooth layer. Only at elevated temperatures, such as 1250° C.–1300° C., the viscosity dropped, and the kiln coating created a viscous bath, with visible melt toe at the 6 o'clock position.

Addition of cryolite (Hall bath) at lower temperatures reduced the viscosity, but soon after, the viscosity started to rise again.

At higher temperatures, at about 1230° C., and after the addition of 5 lbs of fluorspar and 15 lbs of cryolite, the melt became manageable.

A very high viscosity melt was observed each time a blend with higher alumina content was used.

It was found that to obtain a manageable melt, the alumina content has to be 7.1% or less.

The viscosity of the melt was lower at higher temperatures and only became manageable at temperatures above 1150° C.

As a result of the actual experimental and development of the preferred embodiment, it was found that a low viscosity slag was required for successful operation of the continuous slagging single kiln.

It was found that the energy obtained from oxidizing the carbon and the spent potlining was sufficient to run the rotary kiln, during normal operation, including providing for carbon burnout and for maintaining the bath in a molten condition. Under normal conditions, the main burner of the rotary kiln will need to be fired only at a threshold minimum of about 10 percent. The main burner should not be turned off, however, because it needs to be available promptly, during an upset or the like, to be brought to high fire to keep the bath hot and molten.

We have found the spent potlining feed to the rotary kiln of the present invention to be a relatively inert material, i.e., a carbonaceous material which is hard to burn. Nevertheless, the rotary kiln of the present invention was adapted to the extent of achieving carbon burnout at high levels. Such improved carbon burnout is believed to be attributable to the use of calcium carbonate as one of the flux materials. Calcium carbonate decomposed promptly at the temperature of the bath, giving off carbon dioxide gas. Carbon dioxide gas interacted with the carbon in the bath, gasifying the carbon to produce a carbon monoxide/carbon dioxide mixture. The $CO/CO_2$ mixture then migrated to the surface of the bath where it burned in the yellow diffusion flame with the air above the bath, as described hereinabove, while radiating energy back to the bath surface.

It was found, during actual operation of the rotary kiln in the industrial waste management facility of the present invention, that the carbon gasification of the present invention was observed at the surface of the bath of the rotary kiln. During times of upset, when feed material to the rotary kiln had to be interrupted and bath temperatures at the inlet temperature of the rotary kiln had to be maintained by the main burner, the surface of the bath took on a different appearance. In the upset condition, a porous, fluffy partial layer of carbon appeared and floated on the surface of the bath. As time during the upset condition went by, the extent of this layer decreased as it burned away, thereby identifying the material as carbon. It is believed that during operation, the carbon in the bath of the spent potlining while in molten condition in the rotary kiln remained bound slightly to the other bath materials in the rotary kiln bath or pool while melting, and does not appear on the bath surface.

The production of carbon dioxide gas in calcining the calcium carbonate was observed to be sufficient to gasify and remove the carbon before complete melting occurred and the carbon floated to the bath surface.

It was observed that very high levels of carbon burnout were achieved.

Reducing carbon by carbon burnout achieved several important purposes. Residual carbon in the glassy residue product of the present invention contributed undesirable porosity and leachability. Controlling unburnt carbon in the bath avoided poor fluidity and a difficult-to-manage behavior in the material having unburned carbon.

It was found that the present invention requires a rotary kiln of specified dimension. The length and diameter (L/D) ratio must be at least four (4), preferably five (5) or greater. It was observed during the development of the present invention that a length to diameter ratio (L/D) of less than about 4 caused exceptional levels of stress in the kiln sections between the riding rings and the ends. Substantial deformation must be accommodated at the riding rings. The kiln ends with the cone or ring geometry are very stiff. The present invention, however, is successful when increasing the L/D ratio to the prescribed levels of greater than 4, preferably greater than 5.

It was found that the rotary kiln also preferably should have a loaded area fraction of about 10 percent load ±2 percent, with the consequence of improving most process parameters. The original design choice for the rotary kiln and process was about 15 percent for the loaded area of fraction. The 15 percent level of fillage was believed suitable for a process for treating spent potlining, when it is important to have available a large surface area on the bath surface and in contact with the refractory walls. However, it was observed and found that the rotary kiln was so large that problems developed with stress levels in the ends. It was found that a loaded area fraction of about 10 percent load ±2 percent load operated successfully and provided a bath volume sufficient to achieve melting and homogenization of the spent potlining and flux. The lower loaded area fraction required changes in the refractory and discharge steel work to be accommodated.

The slope of the rotary kiln was adjusted, by tipping further toward the discharge end, so as to have a bath whose surface was not parallel to the rotary kiln center line. The tipping caused a reduction in bath volume and bath residence time, with the goal of reducing the time for volatilization of fluorides.

It was during the actual experimental observation that the inventions of (1) the air slinger system and (2) the discharge dam were developed.

The air slinger system was developed for use with the rotary kiln feed and worked well at maintaining and controlling the feed during all slagging conditions and spreading the feed over a substantial portion of the slag surface so that graphite combustion could occur over large areas rather than concentrating in one small area.

The novel discharge dam was found to be necessary to operate to provide for a molten slag bath which would remain free-flowing over the dam and into the water cooling tank. The novel discharge dam, including specific configurations of burners, operated such that there was never any loss of control of the molten bath into a solid form.

It was also during the actual experimental observation that fluorides in the discharge gas from the rotary kiln were found to be more of a problem than was originally anticipated and that the development of a particular scrubbing system prevented the unanticipated volumes of fluorides in the discharge gases from releasing to the atmosphere. Rather, the fluorides then were captured, rerouted, and recycled back to the spent potlining glassification step and encapsulated along with the water of the scrubbing system to provide for controlling discharge to the atmosphere.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing descriptions. Accordingly, this invention is intended to embrace all such alternatives, modifications, and variations which fall within the spirit and scope of the appended claims.

What is claimed is:

1. In a process for treating spent potlining from the electrolytic smelting of aluminum, comprising:
   (i) heating spent potlining in a rotary kiln vessel by admixing spent potlining into a molten salt bath comprising sodium, aluminum, fluoride, calcium, and silicon salts in said rotary kiln vessel at a bath temperature in the range of about 1150° C. to 1250° C. while maintaining said salt bath in a pool at a depth of at least about 24 inches in said rotary kiln over the entire length of said rotary kiln vessel;
   (ii) admixing a solid oxygenating and gasifying compound into said pool of spent potlining in said salt bath, thereby oxygenating and gasifying spent potlining carbon to form carbon monoxide in said pool of spent potlining in said salt bath by decomposing said solid oxygenating and gasifying compound to form carbon dioxide gas, reacting and gasifying said carbon with said carbon dioxide gas in the said salt bath to form said carbon monoxide gas;
   (iii) burning said carbon monoxide gas above the molten salt bath surface;
   (iv) adding siliceous material to said bath; and
   (v) discharging and cooling a portion of said bath to form a display residue suitable for landfill;
   wherein the improvement for feeding spent potlining into said rotary kiln, comprises:
   (a) admixing spent potlining from the electrolytic smelting of aluminum with, solid oxygenating compound, and $SiO_2$ sand to form a feed mixture of spent potlining, solid oxygenating compound, and $SiO_2$ sand;
   (b) injecting said feed mixture into a rotary kiln;
   (c) controlling the feed volume and distribution pattern of said feed mixture injected into said rotary kiln by pneumatic slinger injection distribution onto an elliptical surface area of molten slag in said rotary kiln by adjusting the angle and velocity of said slinger injection distribution;
   (d) monitoring the temperature at a plurality of locations in a molten bath in said rotary kiln; and
   (e) adjusting and controlling the feed volume and distribution pattern of said feed mixture of spent potlining fed to said rotary kiln to maintain a temperature profile in said rotary kiln to produce a reduction in the level of carbon in the spent potlining wherein the spent potlining is heated to a carbon reducing set point of at least 1100° C. while not exceeding a fluoride gas generation maximum temperature of 1250° C.

2. A process as set forth in claim 1, further comprising comminuting the spent potlining prior to admixing with $SiO_2$ sand to increase its surface area to mass ratio.

3. A process as set forth in claim 1, wherein said oxygenating compound comprises calcium carbonate.

4. A process as set forth in claim 3, further comprising blending said spent potlining, $SiO_2$ sand, and calcium carbonate and maintaining a Si/Na molar ratio in the range of about 0.8–1.6 and a $Ca/F_2$ molar ratio in the range of about 1.0–1.6 to control viscosity of said molten bath in the rotary kiln.

5. A process as set forth in claim 4, comprising monitoring the viscosity of said molten bath in the rotary kiln and adjusting and controlling said Si/Na molar ratio and said $Ca/F_2$ molar ratio to control the viscosity of said molten bath in the rotary kiln in response to signals from said monitoring viscosity step.

6. In a process for treating spent potlining from the electrolytic smelting of aluminum, comprising:
   (a) heating spent potlining in a rotary kiln vessel by admixing spent potlining into a molten salt bath comprising sodium, aluminum, fluoride, calcium, and silicon salts in said rotary kiln vessel at a bath temperature in the range of about 1150° C. to 1250° C. while maintaining said salt bath in a pool at a depth of at least about 24 inches in said rotary kiln over the entire length of said rotary kiln vessel;
   (b) admixing a solid oxygenating and gasifying compound into said pool of spent potlining in said salt bath, thereby oxygenating and gasifying spent potlining carbon to form carbon monoxide in said pool of spent potlining in said salt bath by decomposing said solid oxygenating and gasifying compound to form carbon dioxide gas, reacting and gasifying said carbon with said carbon dioxide gas in the said salt bath to form said carbon monoxide gas;
   (c) burning said carbon monoxide gas above the molten salt bath surface;
   (d) adding siliceous material to said bath; and
   (e) discharging and cooling a portion of said bath to form a glassy residue suitable for landfill,
   wherein the improvement comprises:
   establishing said depth of said pool of at least about 24 inches throughout the length of said rotary kiln by providing a dam obstruction positioned at the discharge end of said rotary kiln.

7. A process as set forth in claim 6, further comprising providing burners aimed at the discharge dam and operating said burners to maintain salt bath in a molten condition at said discharge dam.

8. A process as set forth in claim 7, wherein said gasifying comprises gasifying the spent potlining with an oxygenating compound comprising calcium carbonate and mixing the spent potlining with $SiO_2$ sand.

9. A process as set forth in claim 8, wherein said rotary kiln has a length to diameter (L/D) ratio greater than about 4.

10. A process for burning and mixing spent potlining with siliceous material as set forth in claim 9, wherein said rotary kiln has an L/D ratio greater than about 5.

* * * * *